US012429596B2

United States Patent
Gilliland et al.

(10) Patent No.: US 12,429,596 B2
(45) Date of Patent: Sep. 30, 2025

(54) SCANNING LADAR SYSTEM WITH CORRECTIVE OPTIC

(71) Applicant: Continental Autonomous Mobility US, LLC, Auburn Hills, MI (US)

(72) Inventors: Patrick B. Gilliland, Santa Barbara, CA (US); Chunbai Wu, Camarillo, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 856 days.

(21) Appl. No.: 17/657,008

(22) Filed: Mar. 29, 2022

(65) Prior Publication Data
US 2023/0314617 A1    Oct. 5, 2023

(51) Int. Cl.
*G01S 17/894*    (2020.01)
*G01S 7/4865*    (2020.01)
*G01S 17/10*    (2020.01)

(52) U.S. Cl.
CPC .......... *G01S 17/894* (2020.01); *G01S 7/4865* (2013.01); *G01S 17/10* (2013.01)

(58) Field of Classification Search
CPC ....... G01S 17/894; G01S 7/4865; G01S 17/10
See application file for complete search history.

(56) References Cited

U.S. PATENT DOCUMENTS

2018/0045816 A1*  2/2018  Jarosinski ............... G01S 17/42

FOREIGN PATENT DOCUMENTS

| EP | 3187895 B1 | 7/2020 |
|----|------------|--------|
| EP | 3497469 B1 | 10/2020 |

OTHER PUBLICATIONS

International Search Report and Written Opinion dated Nov. 25, 2024 from corresponding International patent application No. PCT/US2023/016574.

* cited by examiner

*Primary Examiner* — Jamil Ahmed

(57) ABSTRACT

A LADAR sensor includes a light emitter, a lens having areas of different refraction, a beam-steering device, and a light sensor. The beam-steering device is between the light emitter and the lens to direct light from the light emitter through the lens. The beam-steering device is designed to scan the aim of light from the light emitter to different ones of the areas of different refraction. The light sensor has a plurality of photodetectors. A controller is programmed to selectively power different combinations of the photodetectors based on the aim of the beam-steering device at the areas of different refraction.

23 Claims, 17 Drawing Sheets

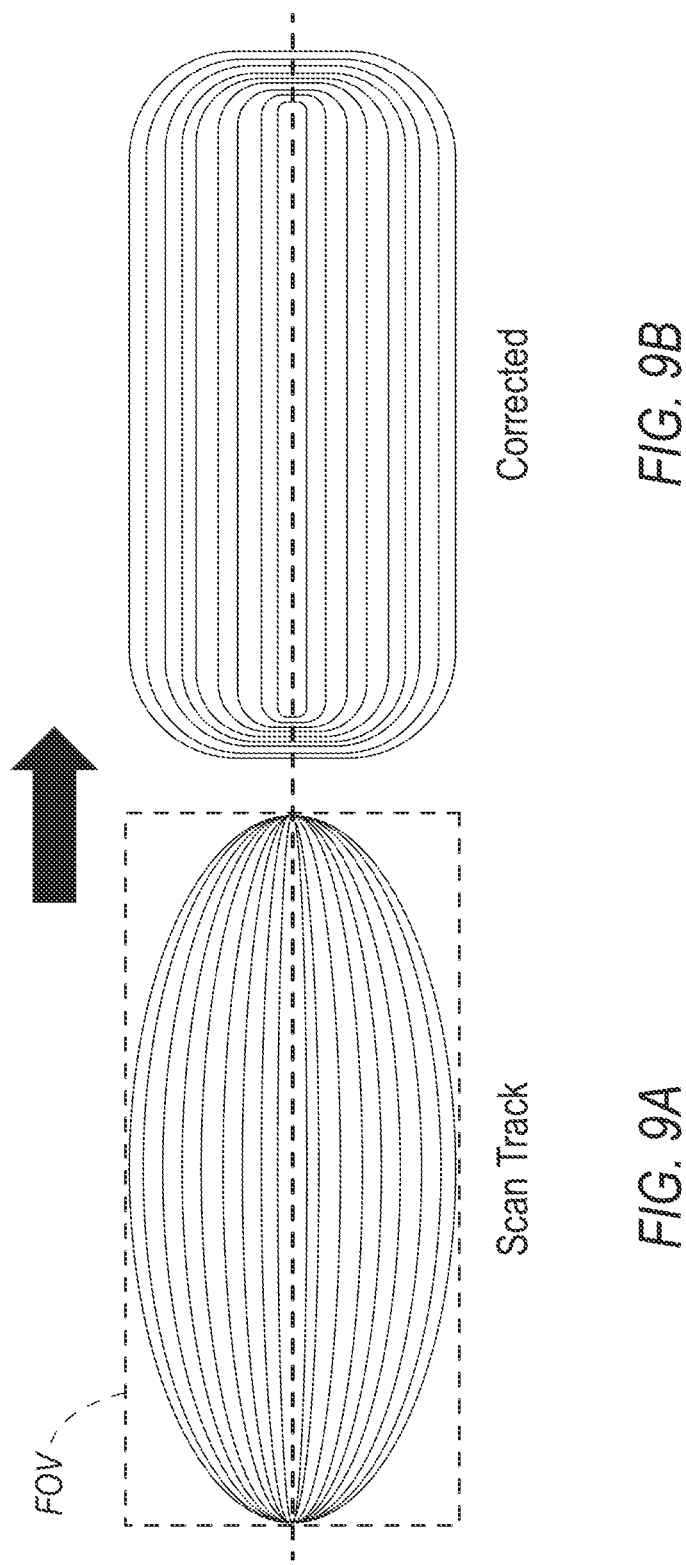

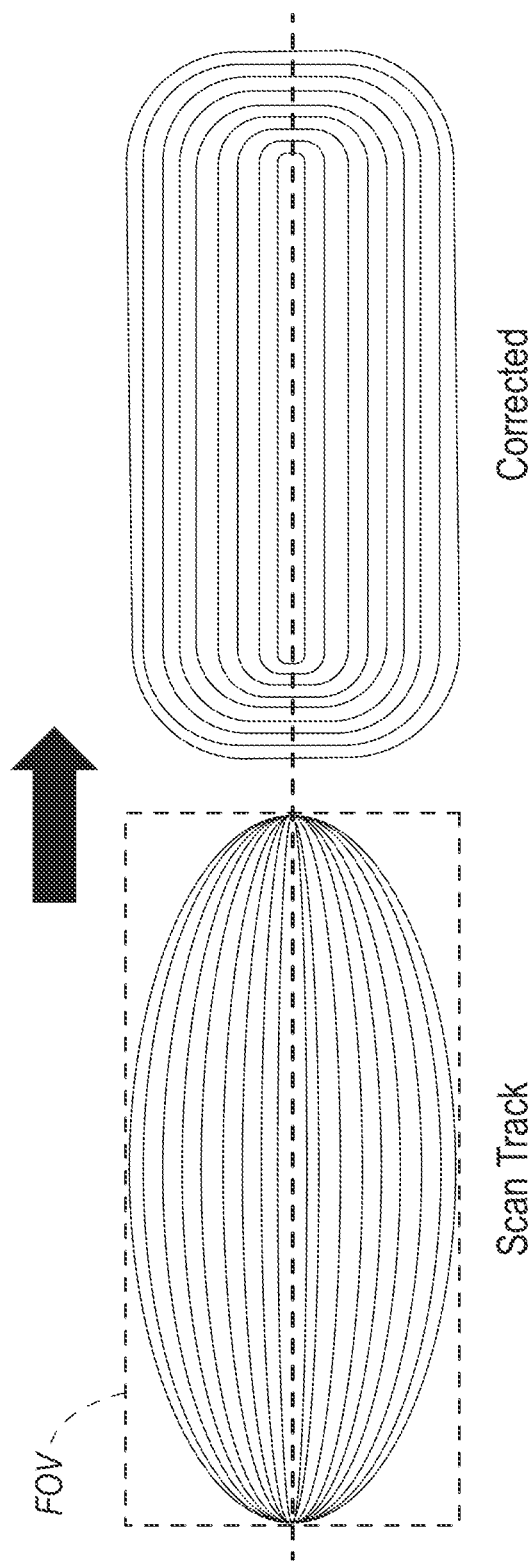

SCANNING LADAR SYSTEM WITH CORRECTIVE OPTIC

BACKGROUND

A scanning LADAR (Light Detection And Ranging) system includes a photodetector, or an array of photodetectors, that is fixed in place relative to a carrier, e.g., a vehicle. Light is emitted into the field of view of the photodetector and the photodetector detects light that is reflected by an object in the field of view, conceptually modeled as a packet of photons. For example, a Flash LADAR system emits pulses of light, e.g., laser light, into the entire field of view. The detection of reflected light is used to generate a three-dimensional (3D) environmental map of the surrounding environment. The time of flight of reflected photons detected by the photodetector is used to determine the distance of the object that reflected the light. A scanning LADAR system operates differently, by progressively illuminating subsections of the field of view until the entire field of view, or a selected region of interest is scanned. This method of scanning the field of view allows for a lower laser peak power, while maintaining or extending range, albeit at the expense of system complexity.

The scanning LADAR system may be mounted on a vehicle to detect objects in the environment surrounding the vehicle and to detect distances of those objects for environmental mapping. The output of the solid-state LADAR system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

A 3D map is generated via threshold detection of the reflected light pulse to each detector of the LADAR receiver, typically a 2D array. Alternatively, in a multi-pulse laser transmission system, a histogram of multiple time of flight measurements may be used to refine range estimates. Calculating and storing histograms of the time of flights may be done digitally if sufficient computation and memory are readily available.

BRIEF DESCRIPTION OF THE DRAWINGS

FIG. 9A is an example of the scan tracks of a beam-steering device of the LADAR sensor overlaid on a field of view FOV of a light sensor of the LADAR sensor.

FIG. 9B is an example approximating the correction of the scan tracks of the beam-steering device by refraction by the lenses of FIGS. 8A-F.

FIG. 13A A is an example of the scan tracks of a beam-steering device of the LADAR sensor overlaid on a field of view FOV of a light sensor of the LADAR sensor.

FIG. 13B is an example approximating the correction of the scan tracks of the beam-steering device by refraction by the lens of FIG. 12.

DETAILED DESCRIPTION

Figure 1:
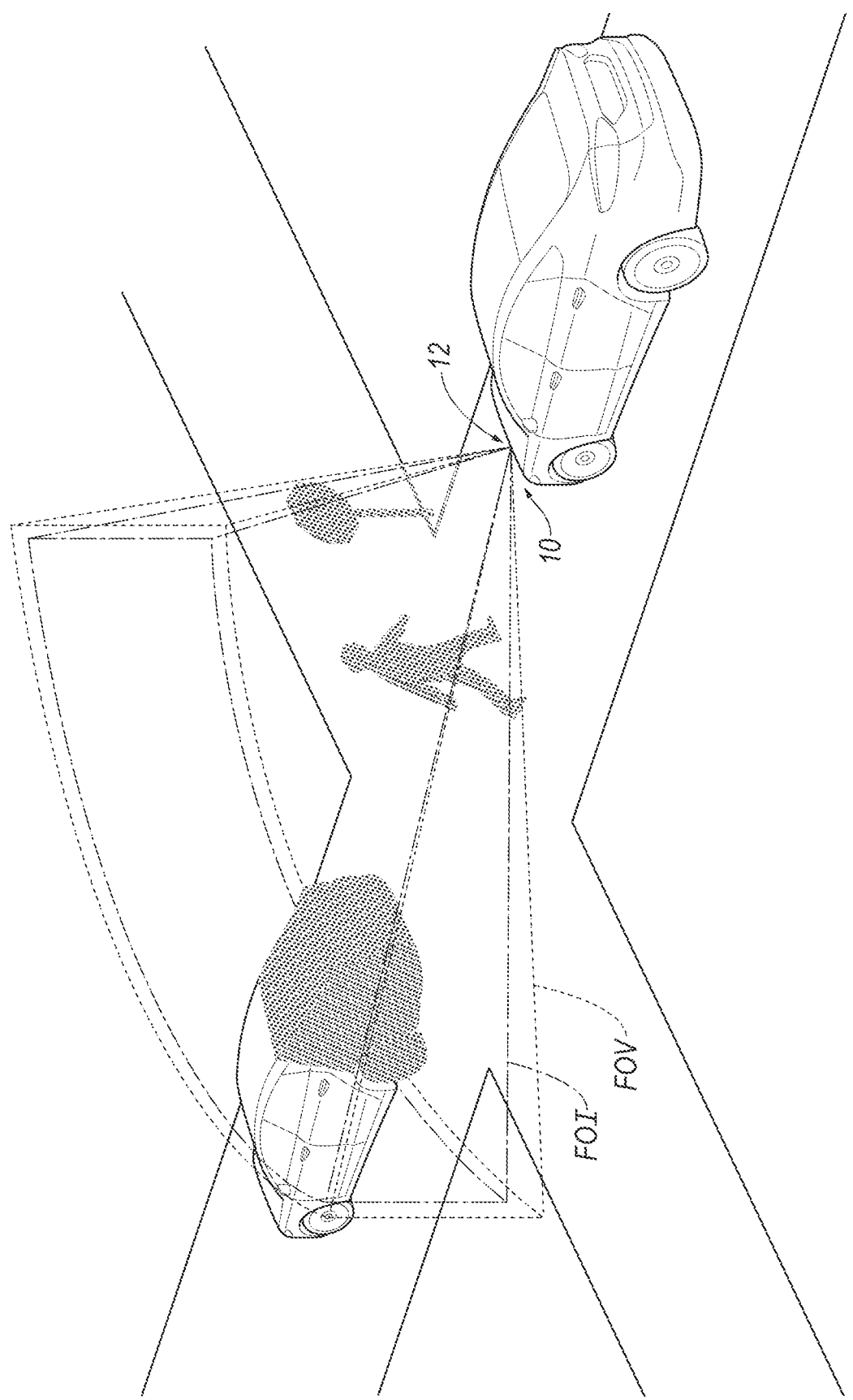
FIG. 1 is a perspective view of a vehicle including a LADAR assembly.

With reference to the Figures, wherein like numerals indicate like parts throughout the several views, a system 10 including a LADAR sensor 12 is generally shown. The LADAR sensor 12 includes a light emitter 14, a lens 16 having areas of different refraction, a beam-steering device 18, and a light sensor 20. The beam-steering device 18 is between the light emitter 14 and the lens 16 to direct light from the light emitter 14 through the lens 16. The beam-steering device 18 is designed to scan the aim of light from the light emitter 14 to different zones of the areas of different refraction. The beam steering device 18 is shown here as a single unit schematically. A gimbal mirror constitutes an example of a single unit capable of steering in both horizontal (azimuth) and vertical (elevation) angles. The scan tracks and optics axes are labelled X (azimuth) and Y (elevation), and correspond to the light patterns projected in the far field of the LADAR sensor 12. One example embodiment for beam steering device 18 includes a cascaded X-mirror (azimuth) and a Y-mirror (elevation) to mechanically de-couple the fast (X) and slow (Y) axes of the beam steering device 18, thereby increasing the maximum angular velocity along the fast (X) axis. In one example, X-mirror and Y-mirror are low mass MEMs devices. The light sensor 20 has a plurality of photodetectors 22. A controller 24 is programmed to selectively power and or combine, different combinations of the photodetectors 22 based on the aim of the beam-steering device 18 at the areas of different refraction of lens 16.

The LADAR sensor 12 emits light from the light emitter 14 into a field of illumination FOI and the light sensor 20 has a field of view FOV that overlaps the field of illumination FOI. Specifically, the beam-steering device 18 aims light from the light emitter 14 into the field of illumination FOI. The areas of different refraction on the lens 16 direct light to areas of the field of illumination FOI that are not easily reached by aim of the beam-steering device 18 alone. In other words, mechanical limitations in the movement of the beam-steering device 18 cause a deviation from a generally rectangular path at corners of the field of illumination FOI, as shown in the example beam-steering device 18 scan tracks shown in FIG. 7. The areas of different refraction in the lens 16 correct the direction of light emitted from the LADAR sensor 12 to a more generally rectangular path, an example of which is shown in FIG. 9B, to approximate the generally rectangular field of view of the light sensor 20. The controller 24 selectively powers different combinations of the photodetectors 22 based on the aim of the beam-steering device 18 at the areas of different refraction to correct for varying density of the scan tracks, i.e., more dense scan tracks at the right and left ends as contrasted with the lower density in the central zone in FIG. 9B.

The lens 16 is elongated along a longitudinal axis X and has a lateral axis Y perpendicular to the longitudinal axis X. The lens 16 includes a first portion 26 and a second portion 28. The lateral axis Y is between the first portion 26 and the second portion 28. The beam-steering device 18 is designed to scan the aim of light from the light emitter 14 in a pattern elongated along the longitudinal axis X. The scan track illustrates the greater path length along the fast (X) axis, and the shorter path along the slow (Y) axis. This is a natural result of many applications, especially automotive, where the greatest interest is in objects above, below, and in the horizontal plane of the LADAR sensor 12. The first portion 26 and the second portion 28 progressively increase in refraction in a direction away from the lateral axis Y to spread the light in ends of the field of view, as shown in the scan tracks in the examples in FIGS. 9B, 11B, and 13B.

The progressive increase in refraction of the first portion 26 and the second portion 28 improves upon the limitations of the beam-steering device 18 at the ends of the field of illumination FOI. Seven examples of the lens 16 are shown in FIGS. 8A-E, 10, and 12. These example lenses 16 in the figures are shown merely as examples and not by way of limitation. A common numeral is used to identify the example lenses 16. The lens 16 is shown schematically in FIG. 3 and any of the example lenses 16 may be incorporated into FIG. 3.

The LADAR sensor 12 is shown in FIG. 1 as being mounted on a vehicle 34. In such an example, the LADAR sensor 12 is operated to detect objects in the environment surrounding the vehicle (by both passive image detection by photodetectors 22 and by active LADAR detection by photodetector 22) and to detect distance, i.e., range, of those objects for environmental mapping (by LADAR detection by photodetector 22). The output of the LADAR sensor 12 (i.e., image detection and LADAR detection) may be used, for example, to autonomously or semi-autonomously control operation of the vehicle 34, e.g., propulsion, braking, steering, etc. Specifically, the LADAR sensor 12 may be a component of or in communication with an advanced driver-assistance system (ADAS) of the vehicle. The LADAR sensor 12 may be mounted on the vehicle in any suitable position and aimed in any suitable direction. As one example, the LADAR sensor 12 is shown on the front of the vehicle 34 and directed forward. The vehicle 34 may have more than one LADAR sensor 12 and/or the vehicle may include other object detection systems, including other LADAR systems. The vehicle 34 shown in the figures is a passenger automobile. As other examples, the vehicle may be of any suitable manned or un-manned type including a plane, satellite, drone, watercraft, etc.

The LADAR sensor 12 may be a sector scan (flash) or scanning) LADAR. In these examples, the LADAR sensor 12 is stationary relative to the vehicle. While the LADAR sensor 12 may have an electro-mechanical beam-steering device 18, such as a MEMS type or galvanometer type, it is differentiated from a spinning mechanical LADAR, also called a rotating LADAR, which rotates 360 degrees. An example embodiment of beam steering device 18 is a low mass MEMs X-mirror oscillating at a frequency below mechanical resonance along the fast axis (azimuth), cascaded with a slower Y-mirror which acts quasi-statically to select the row (elevation) for each pass of the X-mirror. The oscillatory motion in the X-axis is comparable to a tuning fork, as the angular displacement is limited to some +/−60 degrees in an example embodiment. Scanning LADAR sensor 12, for example, may include a casing 36 that is fixed relative to the vehicle 34, i.e., does not move relative to the component of the vehicle 34 to which the casing 36 is attached, and components of the LADAR sensor 12 are supported in the casing 36. As a quasi-solid-state LADAR, the LADAR sensor 12 may be a sector flash LADAR system. In such an example, the LADAR sensor 12 emits pulses, i.e., flashes, of light which illuminate simultaneously a sector of a field of illumination FOI. More specifically, the LADAR sensor 12 may be a 3D flash LADAR system that generates a 3D environmental map of the surrounding environment. Another example of solid-state LADAR includes an optical-phase array (OPA). An example embodiment of scanning LADAR 12 is a micro-electromechanical system (MEMS) beam-steering LADAR, which may also be referred to as a quasi-solid-state LADAR.

The LADAR sensor 12 emits infrared light and detects (i.e., with photodetectors 22) the emitted light that is reflected by an object in the field of view FOV, e.g., pedestrians, street signs, vehicles, etc. Specifically, the LADAR sensor 12 includes a light-emission system 38, a light-receiving system 40, and a controller 24 that controls the light-emission system 38 and the light-receiving system 40. The LADAR sensor 12 may also passively detect ambient visible light reflected by an object in the field of view FOV (i.e., with photodetectors 22).

Figure 2:
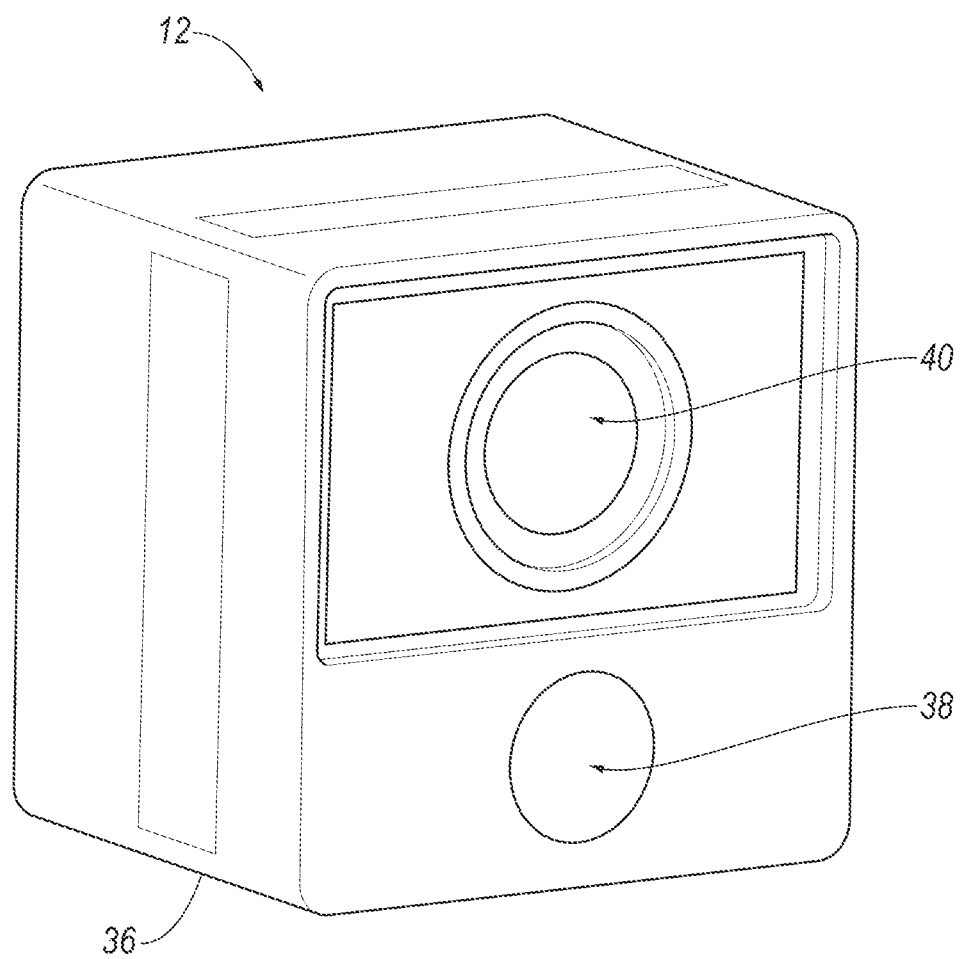
FIG. 2 is a perspective view of the LADAR assembly.
Figure 3:
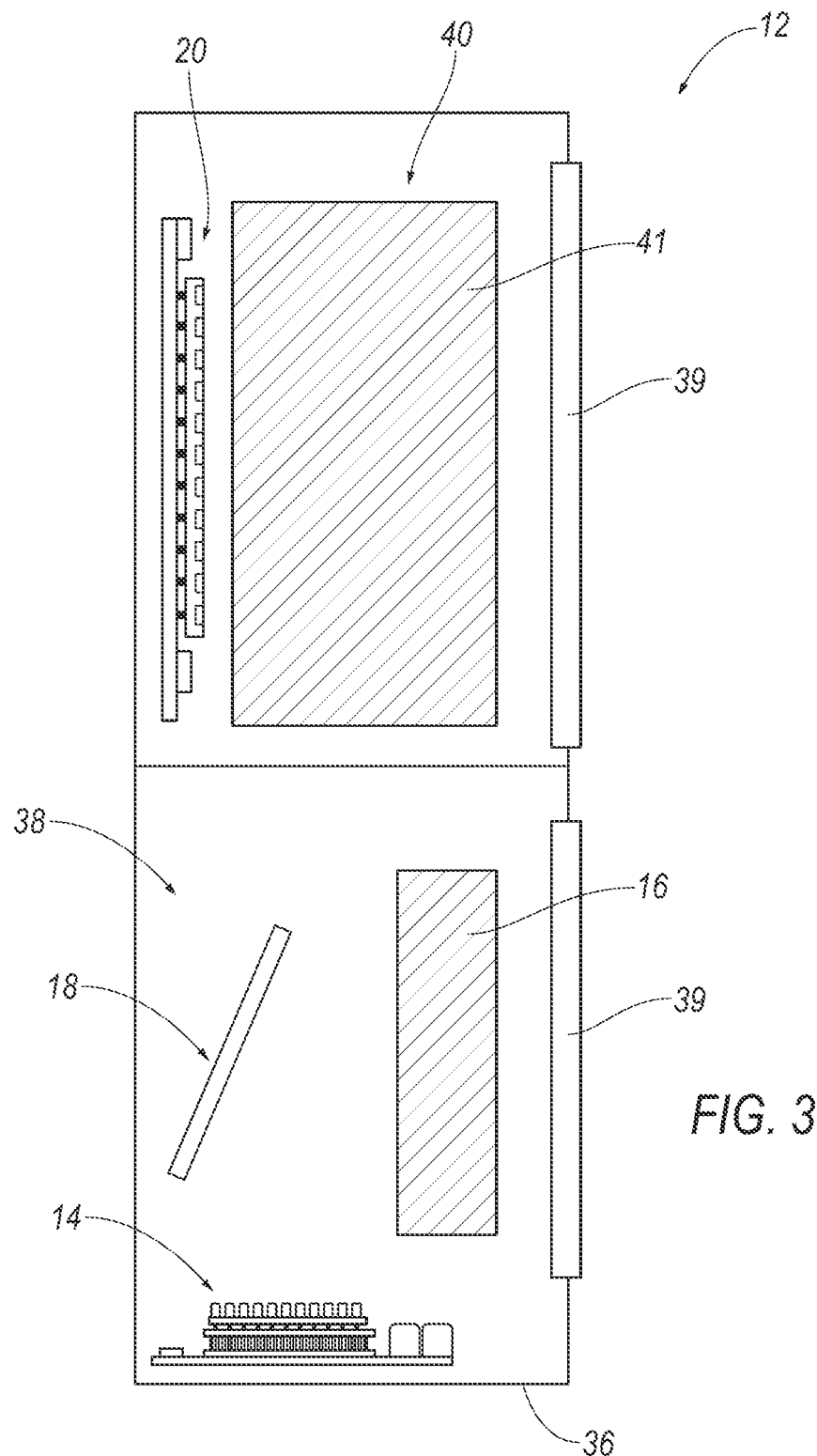
FIG. 3 is a schematic side view of the LADAR assembly.

With reference to FIGS. 2-3, the LADAR sensor 12 may be a unit. Specifically, the LADAR sensor 12 may include a casing 36 that supports the light-emission system 38 and the light-receiving system 40. The casing 36 may enclose the light-emission system 38 and the light-receiving system 40. The casing 36 may include mechanical attachment features to attach the casing 36 to the vehicle and electronic connections to connect to and communicate with electronic systems of the vehicle, e.g., components of the ADAS. The window 39 extends through the casing 36. The window 39 includes an aperture extending through the casing 36 and may include a lens or other optical device in the aperture. The casing 36, for example, may be plastic or metal and may protect the other components of the LADAR sensor 12 from moisture, environmental precipitation, dust, etc. In the alternative to the LADAR sensor 12 being a unit, components of the LADAR sensor 12, e.g., the light-emission system 38 and the light-receiving system 40, may be separated and disposed at different locations of the vehicle.

With reference to FIG. 3, the light-emission system 38 may include one or more light emitter 14 and optical components 16 such as a lens package, lens element, pump delivery optics, etc. The optical components, e.g., lens package, lens element, etc., are between the light emitter 14 and a window 39 on the casing 36. Thus, light emitted from the light emitter 14 passes through the optical components 16 before exiting the casing 36 through the window 39. The optical components may include an optical element, a collimating lens, transmission optics, etc. The optical components direct, focus, and/or shape the light, etc.

The light emitter 14 emits light for illuminating objects for detection. The light-emission system 38 may include a beam-steering device 18 between the light emitter 14 and the window 39. The controller 24 is in communication with the light emitter 14 for controlling the emission of light from the light emitter 14 and, in examples including a beam-steering device 18, the controller 24 is in communication with the beam-steering device 18 for aiming the emission of light from the LADAR sensor 12 into the field of illumination FOI.

The light emitter 14 emits light into the field of illumination FOI for detection by the light-receiving system 40 when the light is reflected by an object in the field of view FOV. The light emitter 14 typically emits pulses of light into the field of illumination FOI. Distance to a reflecting surface is measured by the light-receiving system 40 when the light is reflected by an object in the field of view FOV and photons return to the light-receiving system 40. In some embodiments, the modulation of light emitter 14 is a single pulse or a series of pulses, but may be a sinewave, chirped sinewave, or other suitable alternative light modulation scheme. Specifically, the light emitter 14 emits a series of pulses in an example embodiment. In an example embodiment, a frame may be approximately 8,096 pixels, each pixel capturing a time of flight (TOF) measurement of the laser pulse transmission to and from a reflecting point in the scene. A typical frame rate may be 10-30 Hz, depending on system configuration, and scene dependencies. In an example embodiment, the pixels are arranged in a 64×128 detector array. The light-receiving system 40 has a field of view FOV that overlaps the field of illumination FOI and receives light reflected by surfaces of objects, buildings, road, etc., in the FOV. In other words, the light-receiving system 40 detects laser pulses emitted from the light emitter 14 and reflected in the field of view FOV back to the light-receiving system 40, i.e., detected pulses. The light emitter 14 may be in electrical communication with the controller 24, e.g., to provide the pulse transmissions in response to commands from the controller 24.

The light emitter 14 may be, for example, a laser. The light emitter 14 may be, for example, a semiconductor light emitter 14, e.g., laser diodes. In one example, the light emitter 14 is a vertical-cavity surface-emitting laser (VCSEL). As another example, the light emitter 14 may be a diode-pumped solid-state laser (DPSSL). As another example, the light emitter 14 may be an edge emitting laser diode. The light emitter 14 may be designed to emit a pulsed flash of light, e.g., a pulsed laser light. Specifically, the light emitter 14, e.g., the VCSEL or DPSSL or edge emitter, is designed to emit a pulsed laser light or train of laser light pulses. The light emitted by the light emitter 14 may be, for example, infrared light. Alternatively, the light emitted by the light emitter 14 may be of any suitable wavelength. The LADAR sensor 12 may include any suitable number of light emitters 14, i.e., one or more in the casing 36. In examples that include more than one light emitter 14, the light emitters 14 may be arranged in a column or in columns and rows. In examples that include more than one light emitter 14, the light emitters 14 may be identical or different and may each be controlled by the controller 24 for operation individually and/or in unison. As set forth above, the light emitter 14 may be aimed at an optical element. The light emitter 14 may be aimed directly at the optical element or may be aimed indirectly at the optical element through intermediate components such as reflectors/deflectors, diffusers, optics, etc. The light emitter 14 may be aimed at the beam-steering device 18 either directly or indirectly through intermediate components and the beam-steering device 18 aims the light from the light emitter 14, either directly or indirectly, to the optical components 16.

The light emitter 14 may be stationary relative to the casing 36. In other words, the light emitter 14 does not move relative to the casing 36 during operation of the LADAR sensor 12, e.g., during light emission. The light emitter 14 may be mounted to the casing 36 in any suitable fashion such that the light emitter 14 and the casing 36 move together as a unit.

Figure 7:
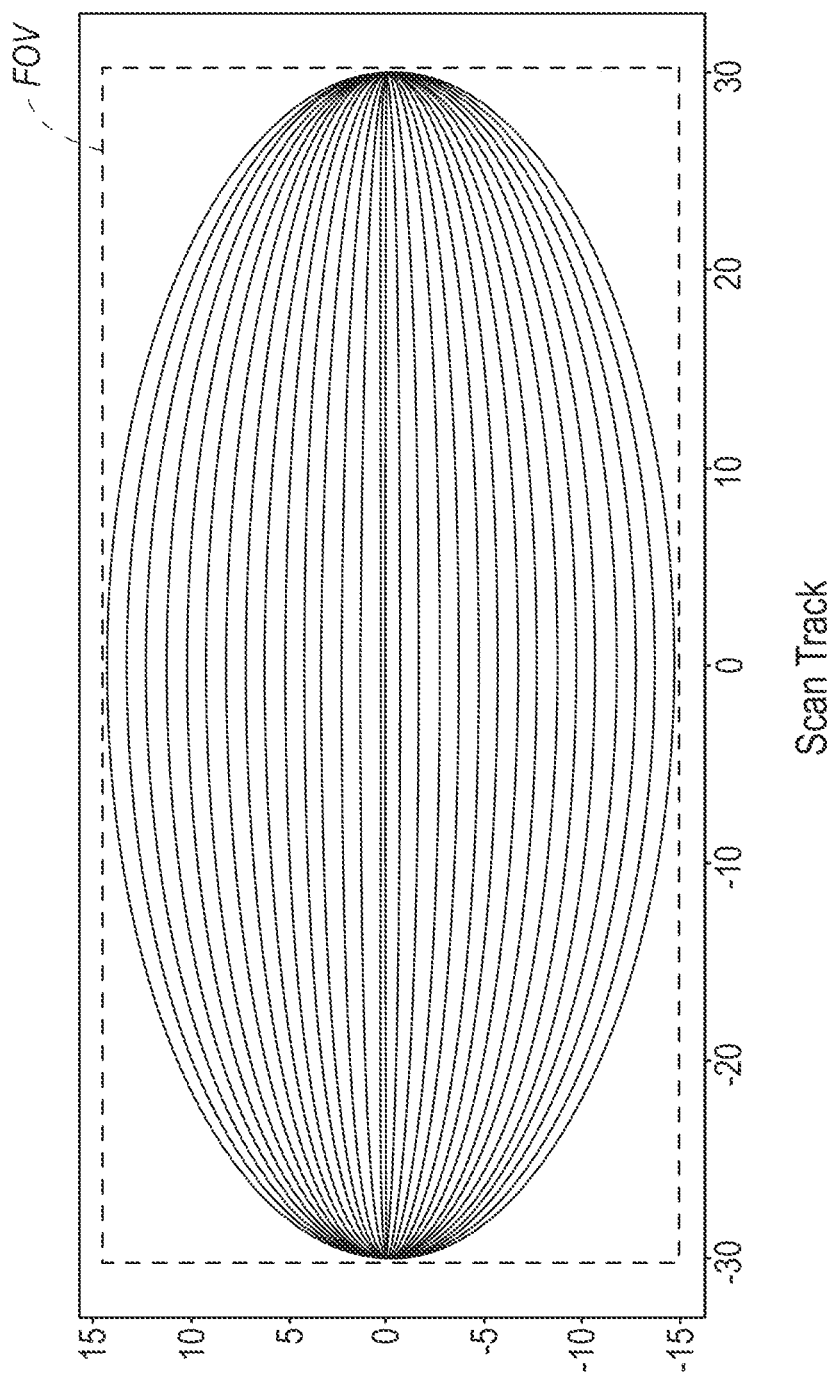
FIG. 7 is an example of the scan tracks of a beam-steering device of the LADAR sensor overlaid on a field of view FOV of a light sensor of the LADAR sensor.

As set forth above, the beam-steering device 18 aims light at the optical components 16. Specifically, the beam-steering device 18 moves along scan tracks, i.e., paths, relative to the optical components 16. An example of scan tracks by the beam-steering device 18 is shown in FIG. 7. As shown in FIG. 7, the scan tracks are generally elliptical and do not reach the outer corners of the field of view FOV of the light sensor 20. Light from the optical components 16 is emitted into the field of illumination. The optical components 16 may produce an elongated FOI along a longitudinal axis X. A lateral axis Y is perpendicular to the longitudinal axis X. The optical components 16 are transparent. The optical components 16 may be glass and/or polymer. In the examples shown in the figures, the longitudinal axis X of the optical components 16 is horizontal and the lateral axis Y of the optical components 16 is vertical. In an example embodiment, optical components 16 may be a simple lens, prismatic element, or diffractive array, or may be a single optical element or a compound optical subsystem having a plurality of optical elements designed to produce the desired optical correction.

Figure 8A:
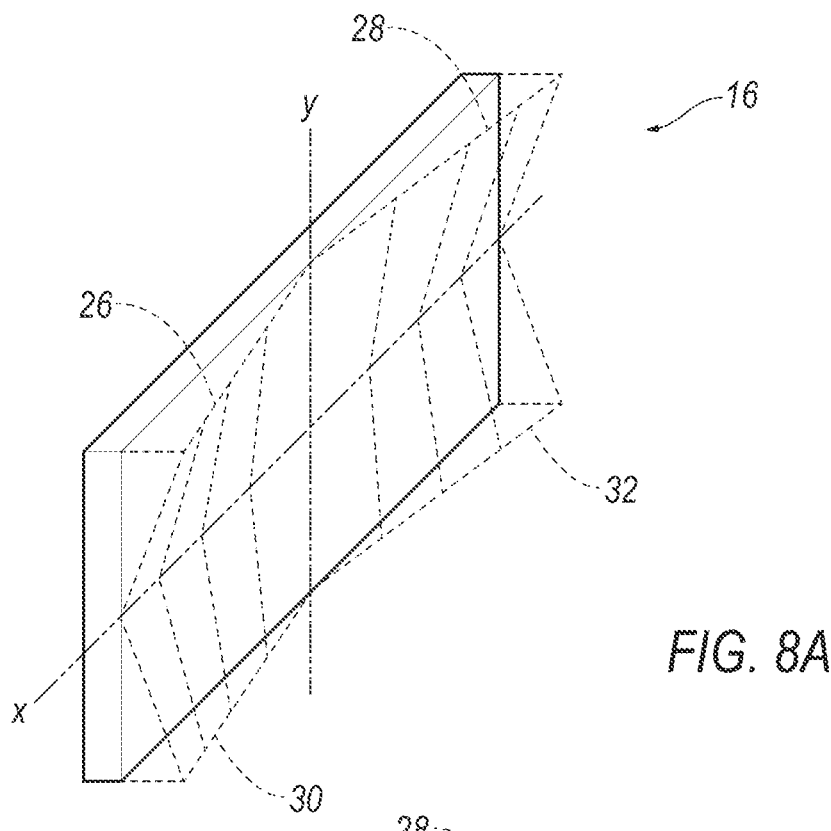
FIGS. 8A-E are examples of lenses of the LADAR sensor.
Figure 8B:
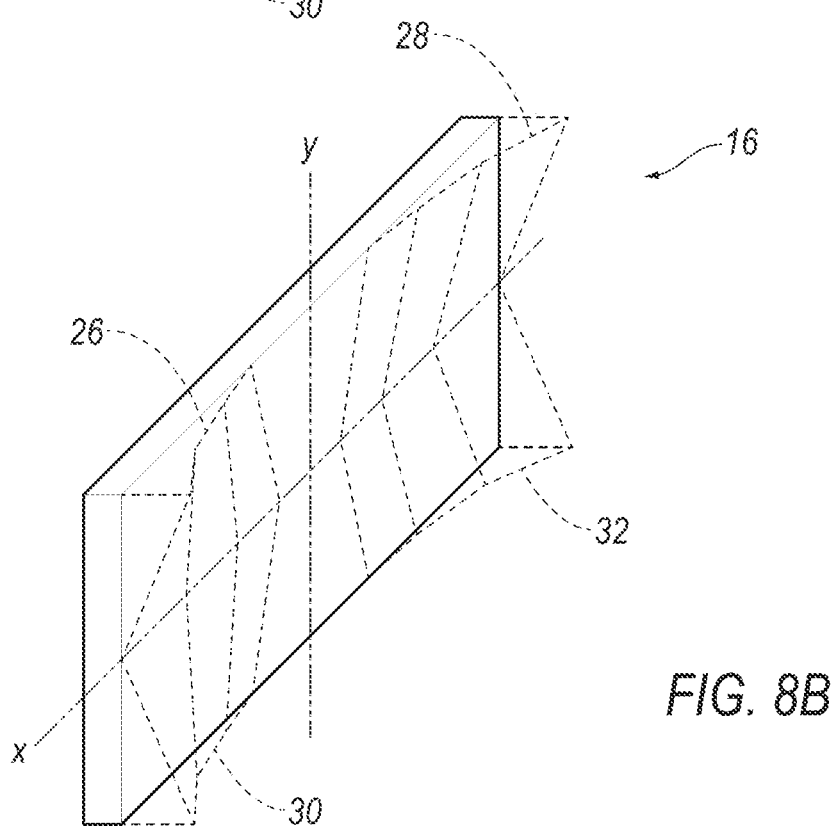
Figure 8C:
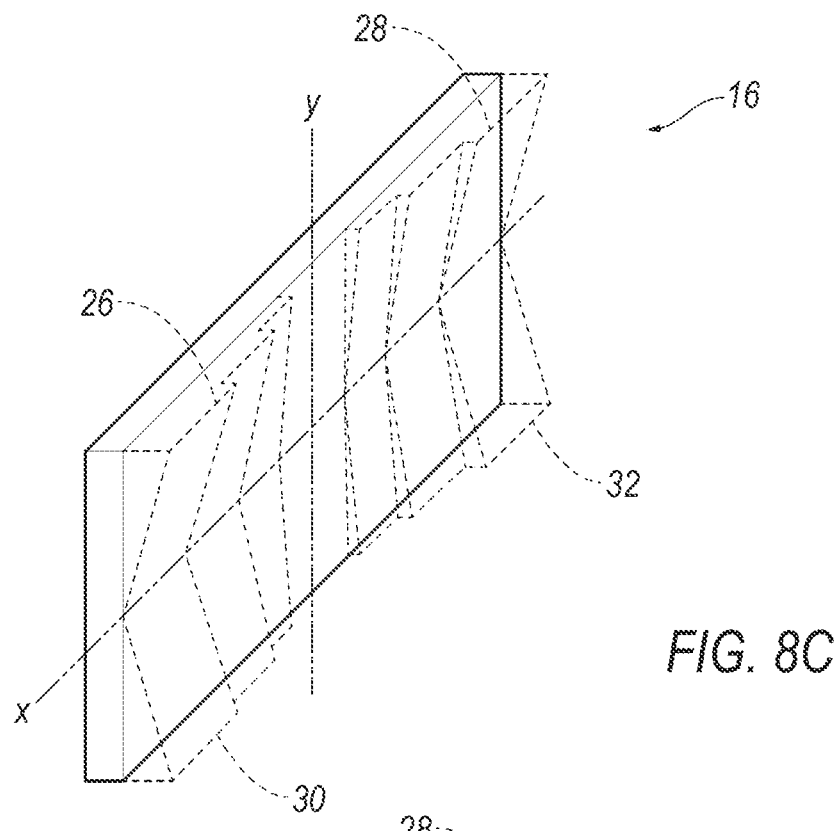

In FIGS. 8A-E, optical components 16 are shown in a simple form as a single lens element 16 for purposes of illustration. The lens 16 has areas of different refraction. In other words, light through the lens 16 is refracted differently in zones of different refraction. The entire lens 16 or areas of the lens 16 may have a refraction which changes continuously (linearly or nonlinearly) along the longitudinal axis X and/or the lateral axis Y, as shown in FIGS. 8A, B, D, and E. As another example, the refraction may change step-wise, as shown in FIG. 8C. In the examples shown in FIGS. 8A-E, the refraction is constant in the central zone at the intersection of longitudinal axis X and lateral axis Y. In all other zones the refraction varies along the longitudinal axis X and the lateral axis Y.

As shown in the examples in FIGS. 8A-E, the lens 16 may include four portions, namely the first portion 26, the second portion 28, a third portion 30, and a fourth portion 32. The third portion 30 is opposite the first portion 26 relative to the longitudinal axis X and the fourth portion 32 is opposite the second portion 28 relative to the longitudinal axis X. The lateral axis Y is between the first portion 26 and the second portion 28 and is between the third portion 30 and the fourth portion 32. Specifically, the first portion 26 abuts the third portion 30 at the longitudinal axis X and abuts the second portion 28 at the lateral axis Y. The fourth portion 32 abuts the second portion 28 at the longitudinal axis X and abuts the third portion 30 at the lateral axis Y.

In the examples shown in FIGS. 8A-F, the first portion 26, the second portion 28, the third portion 30, and the fourth portion 32 progressively increase in refraction in a direction away from the lateral axis Y. In the example shown in FIGS. 8A-F, the first portion 26, the second portion 28, the third portion 30, and the fourth portion 32 each progressively increase in refraction in a direction away from the longitudinal axis X. The increase in refraction in a direction away from the lateral axis Y bends the light outwardly from the lateral axis Y into the field of illumination, e.g., bends the light horizontally at an increasing angle in the direction away from the longitudinal axis X. The increase in refraction in a direction away from the longitudinal axis X bends the light outwardly from the longitudinal axis X into the field of illumination, e.g., bends the light vertically at increasing angle in the direction away from the longitudinal axis X. In the examples shown in the figures, the refraction is greatest at the four corners of the lens 16 such that light from the beam-steering device 18 is directed into corners of the field of illumination FOI, i.e., to generate a rectangular FOI.

In the examples shown in the figures, the refraction is increased by an angular surface change, increasing the thickness of the lens 16. For example the first portion 26, the second portion 28, the third portion 30, and the fourth portion 32 each progressively increase in surface angle and in thickness in a direction away from the lateral axis Y and/or in a direction away from the longitudinal axis X. A back side of the lens 16 may be flat and the front side (i.e., the side at which the beam-steering device 18 is aimed) of the lens 16 may be a continuous curve. In such an example, light from the beam-steering device 18 is aimed at the curved side of the lens 16 and exits the flat side into the field of illumination FOI. In such an example, the shape of the illuminating beam would also be change, creating an elliptical distortion of a narrow circular beam. A narrow circular projected illuminating beam is another example for the scanning LADAR, enabling the maximum in spatial resolution at some distance from the light emission system 38.

The varying thickness corrective lens 16 may be formed by molding methods, or by overmolding. In other words, the lens 16 may be overmolded. Specifically, the lens 16 may include a flat glass layer that is overmolded with polymer to create the varying thickness. "Overmolded" is used herein as a structural description including the characteristics and qualities of overmolded parts, as is known in the art.

With reference to FIG. 8A, the first portion 26, the second portion 28, the third portion 30, and the fourth portion 32 progressively increase linearly in refraction in a direction away from the lateral axis Y and in a direction away from the longitudinal axis X. In other words, each of the first portion 26, the second portion 28, the third portion 30, and the fourth portion 32 have flat faces with linear edges that are not parallel with the longitudinal axis X or the lateral axis Y.

With reference to FIG. 8B, the first portion 26, the second portion 28, the third portion 30, and the fourth portion 32 progressively increase in refraction in a direction away from the lateral axis Y and progressively increase in refraction in a direction away from the longitudinal axis X. In other words, each of the first portion 26, the second portion 28, the third portion 30, and the fourth portion 32 are in twisted planes.

With reference to FIG. 8C, the first portion 26, the second portion 28, the third portion 30, and the fourth portion 32 each increase stepwise in refractive index (e.g., increase in thickness) in a direction away from the lateral axis Y. In that example, the first portion 26, the second portion 28, the third portion 30, and the fourth portion 32 increase in refraction in a direction away from the longitudinal axis X.

Figure 8D:
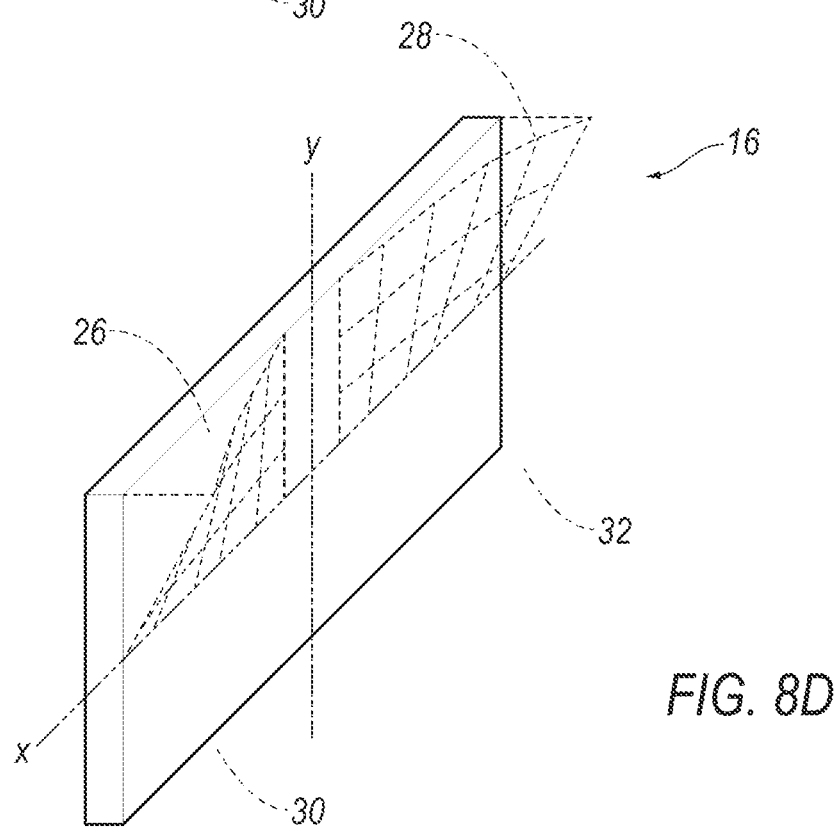

With reference to FIG. 8D, the first portion 26, the second portion 28, the third portion 30, and the fourth portion 32 each include a plurality of flat faces. Each of the flat faces increases in refraction in a direction away from the longitudinal axis X and in a direction away from the longitudinal axis X. In other words, each the flat faces are in different planes.

Figure 8E:
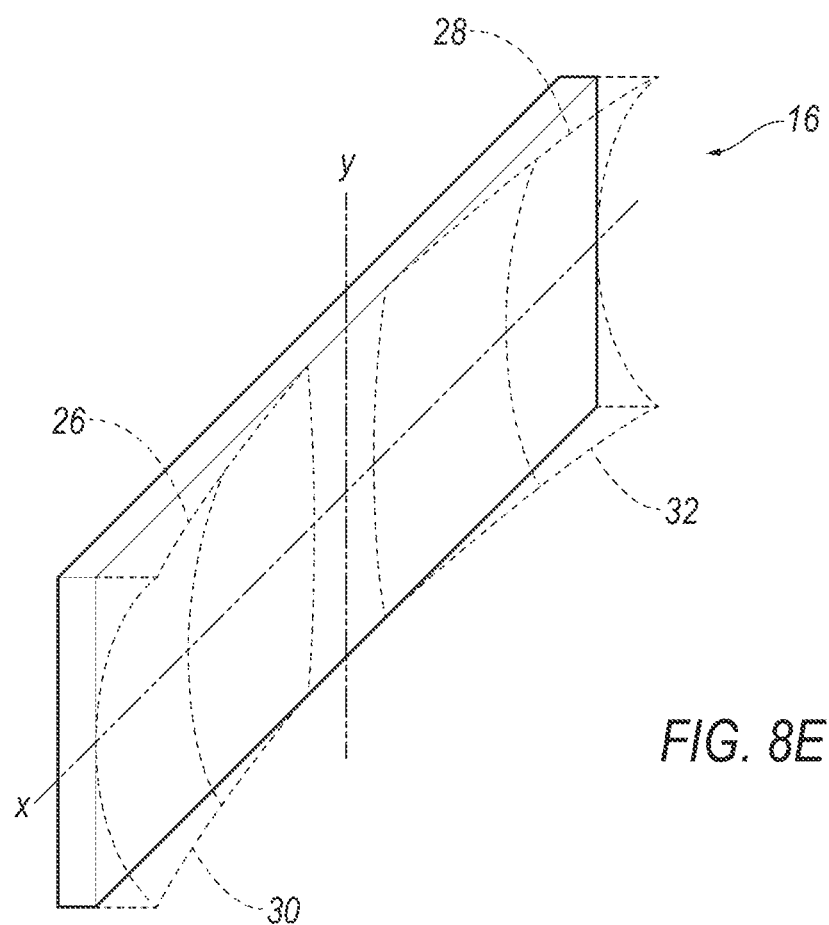

With reference to FIG. 8E, the first portion 26, the second portion 28, the third portion 30, and the fourth portion 32 are curved surfaces, and progressively increase in refraction in a direction away from the lateral axis Y and in a direction away from the longitudinal axis X.

FIGS. 9A and 9B schematically show the approximate effect of the areas of different refraction of the examples in FIGS. 8A-E. FIG. 9A is a duplicate of FIG. 7, which is an example of the scan tracks of the beam-steering device 18 overlaid on a field of view FOV of the light sensor 20. FIG. 9B shows the relative effect of the areas of different refraction of the example lenses 16 shown in FIGS. 8A-E, i.e., the first portion 26, the second portion 28, the third portion 30, and the fourth portion 32. Specifically, the first portion 26, the second portion 28, the third portion 30, and the fourth portion 32 direct light toward the corners of the field of view FOV.

Figure 10:
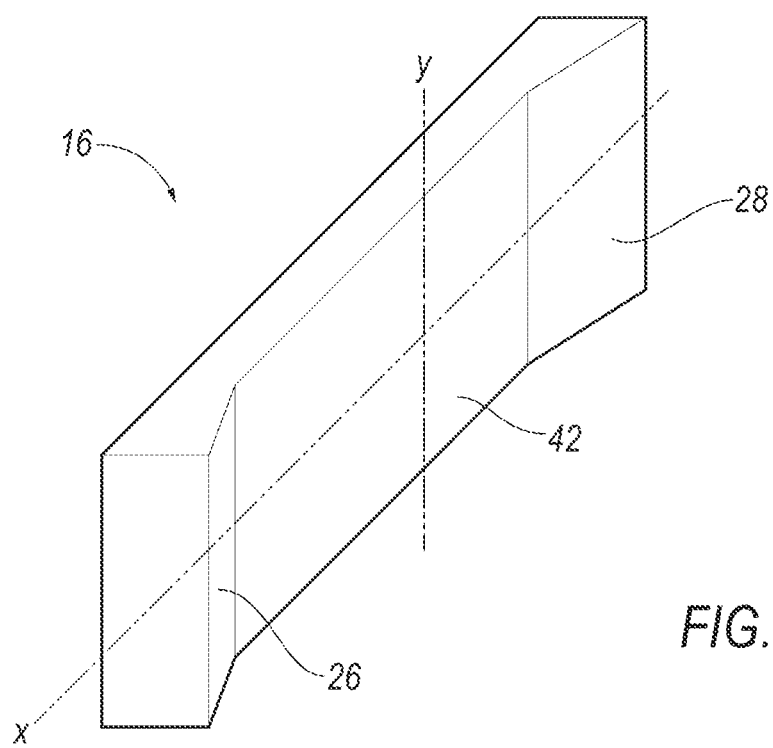
FIG. 10 is another example lens.
Figure 12:
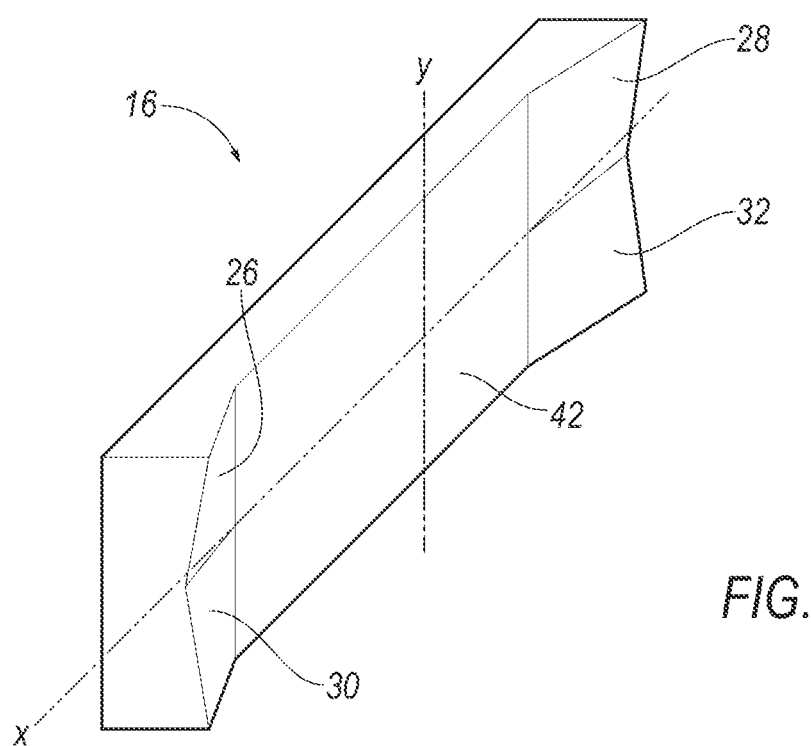
FIG. 12 is another example lens.

With reference to FIGS. 10 and 12, the lens 16 includes a flat middle portion 42 extending from the first portion 26 to the second portion 28. In the example shown in FIG. 10, the first portion 26 and the second portion 28 each increase in refraction in a direction away from the lateral axis Y. The example shown in FIG. 12 includes the third portion 30 and the fourth portion 32. In such an example the third portion 30 and the fourth portion 32 each increase in refraction in a direction away from the lateral axis Y. In the example shown in FIG. 12, the first portion 26, the second portion 28, the third portion 30, and the fourth portion 32 increase in refraction in a direction away from the longitudinal axis X.

Figure 11:
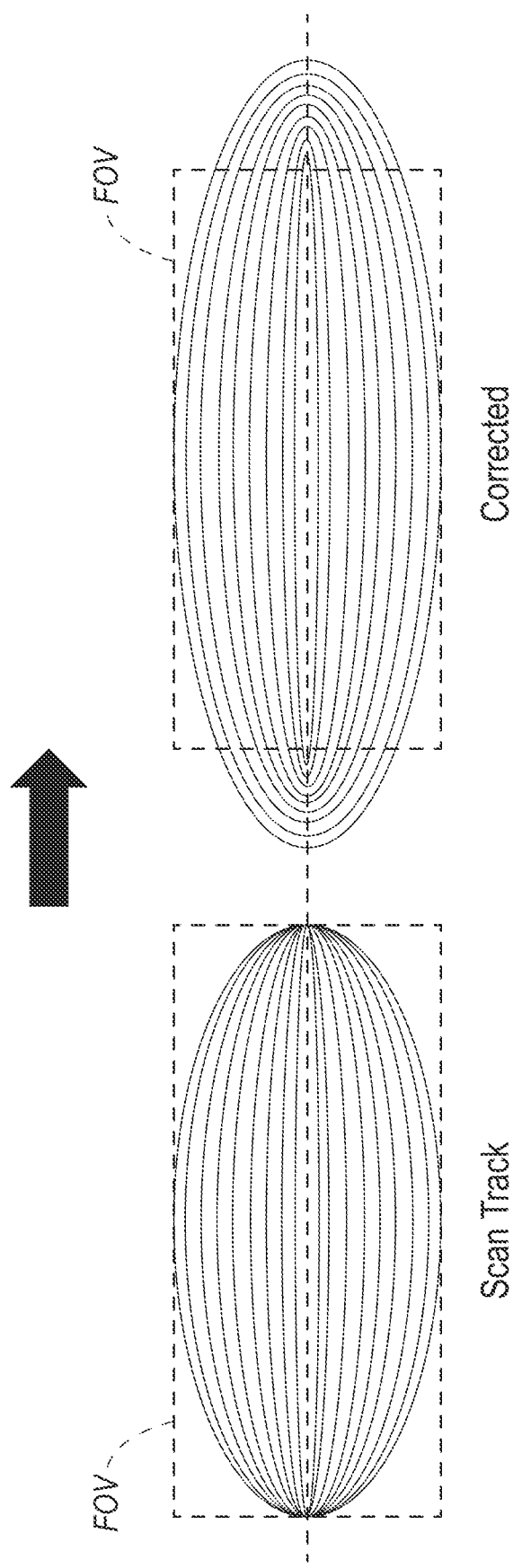
FIG. 11A is an example of the scan tracks of a beam-steering device of the LADAR sensor overlaid on a field of view FOV of a light sensor of the LADAR sensor.
FIG. 11B is an example approximating the correction of the scan tracks of the beam-steering device by refraction by the lens of FIG. 10.

FIGS. 11A and 11B schematically show the approximate effect of the areas of different refraction of the example in FIG. 10. FIG. 11A is a duplicate of FIG. 7, which is an example of the scan tracks of the beam-steering device 18 overlaid on a field of view FOV of the light sensor 20. FIG. 11B shows the relative effect of the areas of different refraction of the lens 16 shown in FIG. 10. In such an example, the refraction by the lens 16 in FIG. 10 directs the light beyond the horizontal boundaries of the field of view FOV, which increases coverage of the scan tracks at the corners of the field of view FOV.

FIGS. 13A and 13B schematically show the approximate effect of the areas of different refraction of the example in FIG. 12. FIG. 13A is a duplicate of FIG. 7, which is an example of the scan tracks of the beam-steering device 18 overlaid on a field of view FOV of the light sensor 20. FIG. 13B shows relative effect of the areas of different refraction of the lens 16 shown in FIG. 12. Specifically, the first portion 26, the second portion 28, the third portion 30, and the fourth portion 32 direct light toward the corners of the field of view FOV. In this example, the scan density at the horizontal ends of the field of view FOV are similar to or the same as the scan density in the middle.

As set forth above, the LADAR sensor 12 includes a beam-steering device 18 that directs light from the light emitter 14 to the lens 16. The beam-steering device 18 is designed to scan the aim of light from the light emitter 14 to any one of the areas of different refraction. For example, the beam-steering device 18 is designed to scan the aim of light from the light emitter 14 in a pattern elongated along the longitudinal axis X. As shown in FIG. 8, the pattern may be oval-shaped.

The beam-steering device 18 may include an micromirror array. For example, the beam-steering device 18 may be a single micro-electro-mechanical system (MEMS) mirror, or a mirror array. As an example, the beam-steering device 18 may be a digital micromirror device (DMD) that includes an array of pixel-mirrors that are capable of being tilted to deflect light. As another example, the beam-steering device 18 may be a liquid-crystal solid-state device including an array of pixels. In such examples, the beam-steering device 18 is designed to move the FOI by adjusting the micromirror array or the array of pixels. As another example, the beam-steering device 18 may be a spatial light modulator or metamaterial with an array of pixels or continuous medium or may be a mirror placed within a voice coil which may be used to steer the mirror.

The beam-steering device 18 is designed to aim light from the light emitter 14 into the FOI positioned to be detected by one or more of the photodetectors 22. In other words, the FOI is smaller than the FOV and the beam-steering device 18 aims the FOI into the FOV such that the FOI is positioned to be detected by a group 48 of the photodetectors 22, i.e., to detect light that is reflected by an object in the FOV. The beam-steering device 18 scans through a sequence of positions. The light emitter 14 emits a modulated light signal or sequence of light pulses at various positions of the beam-steering device 18. These positions, in combination, cover the entire FOV so that the scenes detected by the array of photodetectors 22 at each position can be combined into a frame including light detected in the entire FOV.

The beam-steering device 18 is designed to adjust the aim of the beam-steering device 18 to move the FOI relative to the array of photodetectors 22. For example, when the beam-steering device 18 is aimed in a first position, the FOI is aimed at a first combination of adjacent photodetectors 22. In other words, if light is reflected by an object in the FOI at the first position, the reflected light is detected by the first combination of adjacent photodetectors 22. Likewise, when the beam-steering device 18 is aimed at a second position, the FOI is aimed at a second combination of photodetectors 22. Each photodetector 22 of the array of photodetectors 22 is illuminated at least once in the combination of all positions of the FOI.

The light-receiving system 40 has a field of view FOV that overlaps the field of illumination FOI and receives light reflected by objects in the FOV. The light-receiving system 40 may include receiving optics 41 and a light sensor 20 having the array of photodetectors 22. The light-receiving system 40 may include a receiving window 39 and the receiving optics 41 may be between the receiving window and the light sensor 20. The receiving optics 41 may be of any suitable type and size.

The light sensor 20 includes a detector substrate and the array of photodetectors 22 is on the detector substrate, as described further below. The detector substrate may be silicon (Si), indium gallium arsenide (InGaAs), germanium (Ge), etc., as is known. The detector substrate and the photodetectors 22 are shown schematically. The array of photodetectors 22 is 2-dimensional. Specifically, the array of photodetectors 22 includes a plurality of photodetectors 22 arranged in a columns and rows (schematically shown in FIGS. 4 and 4A).

Each photodetector 22 is light sensitive. Specifically, each photodetector 22 detects photons by photo-excitation of electric carriers. An output signal from the photodetector 22 indicates detection of light and may be proportional to the amount of detected light. The output signals of each photodetector 22 are collected to generate a scene detected by the photodetector 22 and associated readout integrated circuit.

The photodetector 22 may be of any suitable type, e.g., photodiodes (i.e., a semiconductor device having a p-n junction or a p-i-n junction) including avalanche photodiodes (APD), a single-photon avalanche diode (SPAD), a PIN diode, metal-semiconductor-metal photodetectors 22, phototransistors, photoconductive detectors, phototubes, photomultipliers, etc. The photodetectors 22 may each be of the same type.

Avalanche photo diodes (APD) are analog devices that output an analog signal, e.g., a current that is proportional to the light intensity incident on the detector. APDs have high dynamic range as a result but need to be backed by several additional analog circuits, such as a transconductance or transimpedance amplifier, a variable gain or differential amplifier, a high-speed A/D converter, one or more digital signal processors (DSPs) and the like.

In examples in which the photodetectors 22 are SPADs, the SPAD is a semiconductor device, specifically, an APD, having a p-n junction that is reverse biased (herein referred to as "bias") at a voltage that exceeds the breakdown voltage of the p-n junction, i.e., in Geiger mode. The bias voltage is at a magnitude such that a single photon injected into the depletion layer triggers a self-sustaining avalanche, which produces a readily-detectable avalanche current. The leading edge of the avalanche current indicates the arrival time of the detected photon. In other words, the SPAD is a triggering device of which usually the leading edge determines the trigger.

The SPAD operates in Geiger mode. "Geiger mode" means that the APD is operated above the breakdown voltage of the semiconductor and a single electron-hole pair (generated by absorption of one photon) can trigger a strong avalanche. The SPAD is biased above its zero-frequency breakdown voltage to produce an average internal gain on the order of one million. Under such conditions, a readily-detectable avalanche current can be produced in response to a single input photon, thereby allowing the SPAD to be utilized to detect individual photons. "Avalanche breakdown" is a phenomenon that can occur in both insulating and semiconducting materials. It is a form of electric current multiplication that can allow very large currents within materials which are otherwise good insulators. It is a type of electron avalanche. In the present context, "gain" is a measure of an ability of a two-port circuit, e.g., the SPAD, to increase power or amplitude of a signal from the input to the output port.

When the SPAD is triggered in a Geiger-mode in response to a single input photon, the avalanche current continues as long as the bias voltage remains above the breakdown voltage of the SPAD. Thus, in order to detect the next photon, the avalanche current must be "quenched" and the SPAD must be reset. Quenching the avalanche current and resetting the SPAD involves a two-step process: (i) the bias voltage is reduced below the SPAD breakdown voltage to quench the avalanche current as rapidly as possible, and (ii) the SPAD bias is then raised by a power-supply circuit 44 to a voltage above the SPAD breakdown voltage so that the next photon can be detected.

Each photodetector 22 can output a count of incident photons, a time between incident photons, a time of incident photons (e.g., relative to an illumination output time), or other relevant data, and the LADAR sensor 12 can transform these data into distances from the LADAR sensor 12 to external surfaces in the field of view FOVs. By merging these distances with the position of photodetectors 22 at which these data originated and relative positions of these photodetectors 22 at a time that these data were collected, the LADAR sensor 12 (or other device accessing these data) can reconstruct a three-dimensional (virtual or mathematical) model of a space occupied by the LADAR sensor 12, such as in the form of 3D image represented by a rectangular matrix of range values, wherein each range value in the matrix corresponds to a polar coordinate in 3D space. Each photodetector 22 in a SPAD design can be configured to detect a single photon per sampling period, e.g., in the example in which the photodetector 22 is a SPAD. The photodetector 22 functions to output a single signal or stream of signals corresponding to a count of photons incident on the photodetector 22 within one or more sampling periods. Each sampling period may be picoseconds, nanoseconds, microseconds, or milliseconds in duration. The photodetector 22 can output a count of incident photons, a time between incident photons, a time of incident photons (e.g., relative to an illumination output time), or other relevant data, and the LADAR sensor 12 can transform these data into distances from the LADAR sensor 12 to external surfaces in the fields of view of these photodetectors 22. By merging these distances with the position of photodetectors 22 at which these data originated and relative positions of these photodetectors 22 at a time that these data were collected, the controller 24 (or other device accessing these data) can reconstruct a three-dimensional 3D (virtual or mathematical) model of a space within FOV, such as in the form of 3D image represented by a rectangular matrix of range values, wherein each range value in the matrix corresponds to a polar coordinate in 3D space.

Figures 4, 4A:
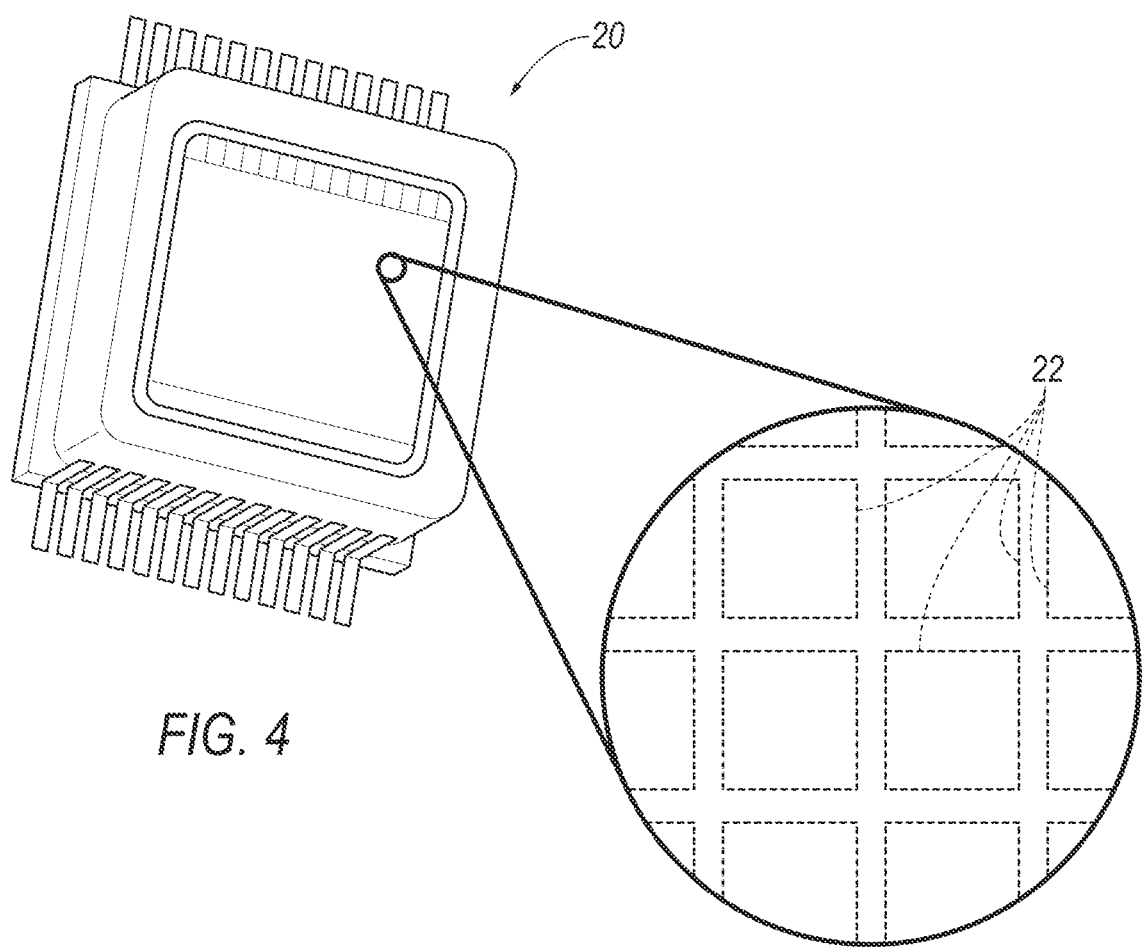
FIG. 4 is a perspective view of a light sensor of the LADAR assembly.
FIG. 4A is a magnified view of the light sensor schematically showing an array of photodetectors.

With reference to FIGS. 4 and 4A, the photodetectors 22 may be arranged as an array, e.g., a 2-dimensional arrangement. A 2D array of photodetectors 22 includes a plurality of photodetectors 22 arranged in columns and rows. Specifically, the light sensor 20 may be a focal-plane array (FRA).

The light sensor 20 includes a plurality of pixels. Each pixel may include one or more photodetectors 22. The pixels each including a power-supply circuit 44 and a read-out integrated circuit (ROIC 46). The photodetectors 22 are connected to the power-supply circuit 44 and the ROIC 46. Multiple pixels may share a common power-supply circuit 44 and/or ROIC 46.

The light sensor 20 detects photons by photo-excitation of electric carriers. An output from the light sensor 20 indicates a detection of light and may be proportional to the amount of detected light, in the case of a PIN diode or APD, and may be a digital signal in case of a SPAD. The outputs of light sensor 20 are collected to generate a 3D environmental map, e.g., 3D location coordinates of objects and surfaces within the field of view FOV of the LADAR sensor 12.

Figure 5:
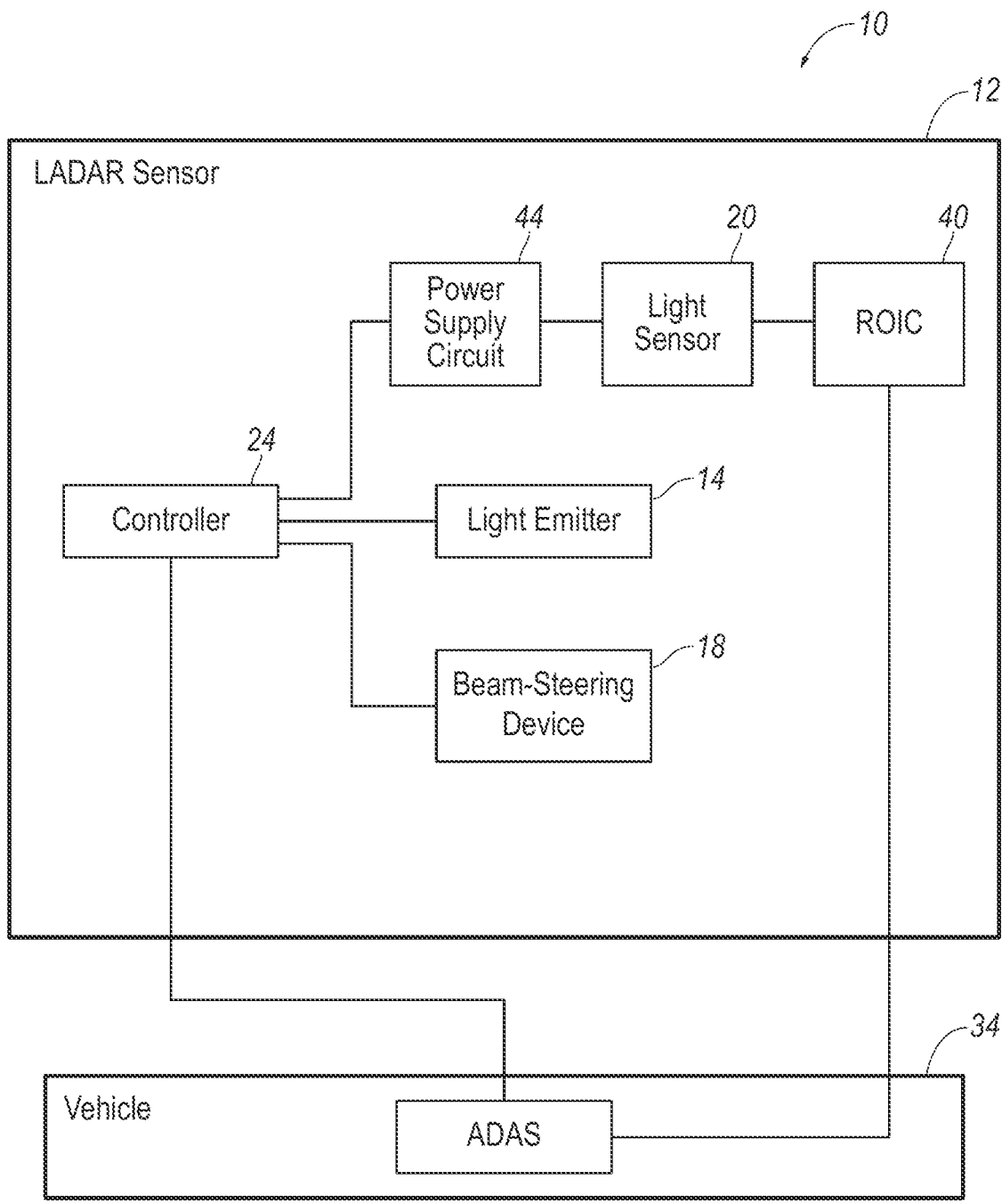
FIG. 5 is a block diagram of the LADAR system.

With reference to FIG. 5, the ROIC 46 converts an electrical signal received from photodetectors 22 of the FPA to digital signals. The ROIC 46 may include electrical components which can convert electrical voltage to digital data. The ROIC 46 may be connected to the controller 24, which receives the data from the ROIC 46 and may generate 3D environmental map based on the data received from the ROIC 46.

The power-supply circuits 44 supply power to the photodetectors 22. The power-supply circuit 44 may include active electrical components such as MOSFET (Metal-Oxide-Semiconductor Field-Effect Transistor), BiCMOS (Bipolar CMOS), etc., and passive components such as resistors, capacitors, etc. As an example, the power-supply circuit 44 may supply power to the photodetectors 22 in a first voltage range that is higher than a second operating voltage of the ROIC 46. The power-supply circuit 44 may receive timing information from the ROIC 46.

The light sensor 20 may include one or more circuits that generates a reference clock signal for operating the photodetectors 22. Additionally, the circuit may include logic circuits for actuating the photodetectors 22, power-supply circuit 44, ROIC 46, etc.

As set forth above, the light sensor 20 includes a power-supply circuit 44 that powers the pixels. The light sensor 20 may include a single power-supply circuit 44 in communication with all pixels or may include a plurality of power-supply circuits 44 in communication with a group 48 of the pixels. In an example embodiment, power supply circuit 44 may provide individual regulation of photodetector bias voltage per detector element to improve the uniformity of the photoelectric signal conversion across the 2D array. This type of pixel-by-pixel voltage bias regulation is especially useful for improving the uniformity of response for APD and SPAD photodetector arrays.

The power-supply circuit 44 may include active electrical components such as MOSFET (Metal-Oxide-Semiconductor Field-Effect Transistor), BiCMOS (Bipolar CMOS), IGBT (Insulated-gate bipolar transistor), VMOS (vertical MOSFET), HexFET, DMOS (double-diffused MOSFET) LDMOS (lateral DMOS), BJT (Bipolar junction transistor), etc., and passive components such as resistors, capacitors, etc. The power-supply circuit 44 may include a power-supply control circuit. The power-supply control circuit may include electrical components such as a transistor, logical components, etc. The power-supply control circuit may control the power-supply circuit 44, e.g., in response to a command from the controller 24, to apply bias voltage and quench and reset the SPAD.

In examples in which the photodetector 22 is an avalanche-type photodiode, e.g., a SPAD, to control the power-supply circuit 44 to apply bias voltage, quench, and reset the avalanche-type diodes, the power-supply circuit 44 may include a power-supply control circuit. The power-supply control circuit may include electrical components such as a transistor, logical components, etc. In an example embodiment, a bias voltage, produced by the power-supply circuit 44, is applied to the cathode of the avalanche-type diode. An output of the avalanche-type diode, e.g., a voltage at a node, is measured by the ROIC 46 circuit to determine whether a photon is detected. The power-supply circuit 44 supplies the bias voltage to the avalanche-type diode based on inputs received from a driver circuit of the ROIC 46. The ROIC 46 may include the driver circuit to actuate the power-supply circuit 44, an analog-to-digital converter (ADC), or time-to-digital converter (TDC) circuit to measure an output of the avalanche-type diode at the node, and/or other electrical components such as volatile memory (register), and logical control circuits, etc. The driver circuit may be controlled based on an input received from the circuit of the light sensor 20, e.g., a reference clock, or a signal level. Data read by the ROIC 46 may be then stored in, for example, a memory circuit. A controller 24 of the LADAR sensor 12 may receive data from the memory circuit and generate a 3D environmental map, location coordinates of an object within the field of view FOV of the LADAR sensor 12, etc.

The controller 24 actuates the power-supply circuit 44 to apply a bias voltage to the plurality of avalanche-type diodes. For example, the controller 24 may be programmed to actuate the ROIC 46 to send commands via the ROIC 46 driver to the power-supply circuit 44 to apply a bias voltage to individually powered avalanche-type diodes. Specifically, the controller 24 supplies bias voltage to avalanche-type diodes of the plurality of pixels of the focal-plane array through a plurality of the power-supply circuits 44, each power-supply circuit 44 dedicated to one of the pixels, as described above. The individual addressing of power to each pixel can also be used to compensate manufacturing variations via look-up-table programmed at an end-of-line testing station. The look-up-table may also be updated through periodic maintenance of the LADAR sensor 12.

Figure 6:
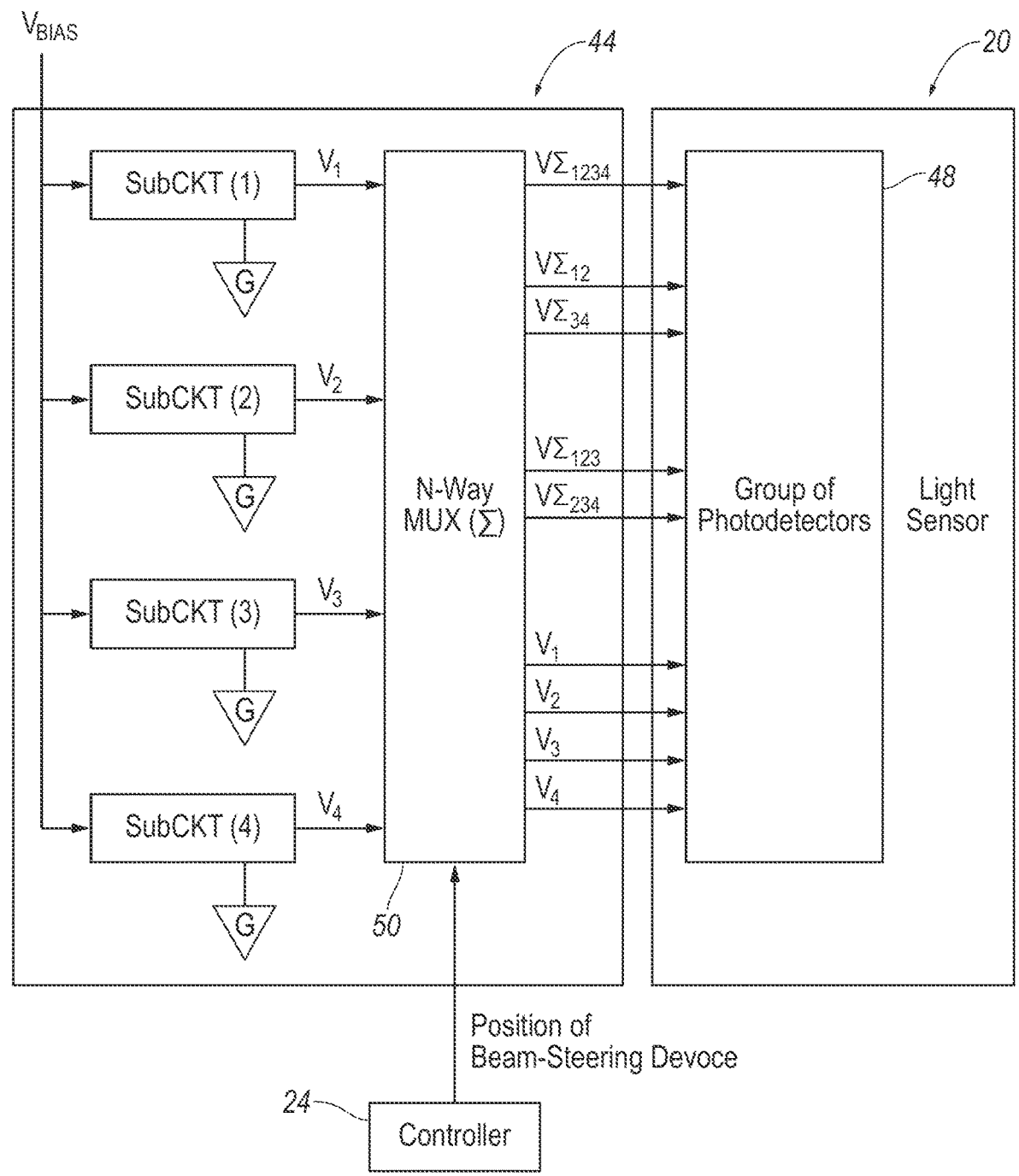
FIG. 6 is a block diagram of a portion of the LADAR system.
Figure 16:
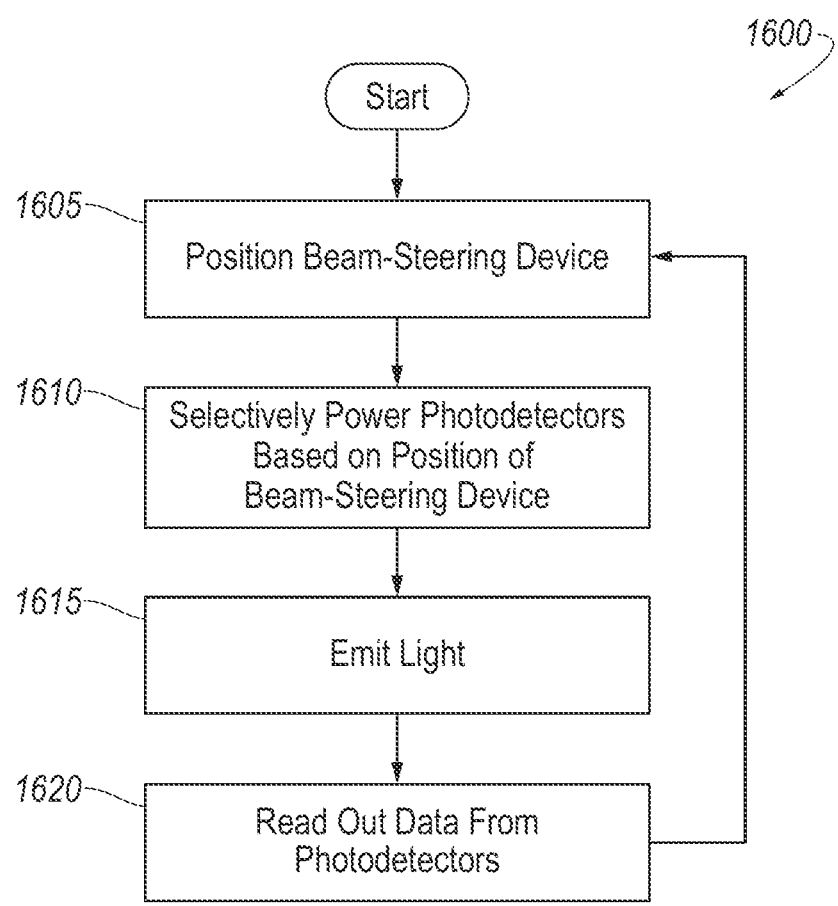
FIG. 16 is a flowchart showing an exemplary method.

As described further below, the photodetectors 22 may be grouped into groups 48. Various combinations of photodetectors 22 of a group 48 may be powered based on the position of the beam-steering device 18, i.e., the aim of light from the light emitter 14 at different areas of refraction of the lens 16. In the example shown schematically in FIG. 16, the photodetectors 22 are grouped into groups 48 of twelve photodetectors 22, specifically three columns and four rows. The controller 24 may selectively power each row independent of other rows, as shown in FIG. 16 and described further below. With reference to FIG. 6, the controller 24 may control a multiplexer 50 to selectively power the rows. Specifically, the multiplexer 50 manages power distribution to any one or combination of the rows of photodetectors 22.

The controller 24 is in electronic communication with the pixels (e.g., with the ROIC 46 and power-supply circuit 44) and the vehicle (e.g., with the ADAS) to receive data and transmit commands. The controller 24 may be configured to execute operations disclosed herein.

The controller 24 is a physical, i.e., structural, component of the LADAR sensor 12. The controller 24 may be a microprocessor-based controller, an application specific integrated circuit (ASIC), field programmable gate array (FPGA), etc., or a combination thereof, implemented via discrete circuits, integrated circuits, and/or other electronic components.

For example, the controller 24 may include a processor, memory, etc. In such an example, the memory of the controller 24 may store instructions executable by the processor, i.e., processor-executable instructions, and/or may store data. The memory includes one or more forms of controller 24 readable media, and stores instructions executable by the controller 24 for performing various operations, including as disclosed herein. As another example, the controller 24 may be or may include a dedicated electronic circuit including an ASIC (application specific integrated circuit) that is manufactured for a particular operation, e.g., calculating a histogram of data received from the LADAR sensor 12 and/or generating a 3D environmental map for a field of view FOV of the light sensor 20 and/or an image of the field of view FOV of the light sensor 20. As another example, the controller 24 may include an FPGA (field programmable gate array) which is an integrated circuit manufactured to be configurable by a customer. As an example, a hardware description language such as VHDL or Verilog may used in electronic design automation to describe digital and mixed-signal systems such as FPGA and ASIC. For example, an ASIC is manufactured based on hardware description language (e.g., VHDL programming) provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a circuit package. A controller 24 may be a set of controllers communicating with one another via a communication network of the vehicle, e.g., a controller 24 in the LADAR sensor 12 and a second controller 24 in another location in the vehicle.

The controller 24 may be in communication with the communication network of the vehicle to send and/or receive instructions from the vehicle, e.g., components of the ADAS. The controller 24 is programmed to perform the method and function described herein and shown in the figures. In an example including a processor and a memory, the instructions stored on the memory of the controller 24 include instructions to perform the method and function described herein and shown in the figures. In an example including an ASIC, the hardware description language (e.g., VHDL) and/or memory electrically connected to the circuit include instructions to perform the method and function described herein and shown in the figures. In an example including an FPGA, the hardware description language (e.g., VHDL) and/or memory electrically connected to the circuit include instructions to perform the method and function described herein and shown in the figures. Use herein of "based on," "in response to," and "upon determining," indicates a causal relationship, not merely a temporal relationship.

The controller 24 may provide data, e.g., a 3D environmental map and/or images, to the ADAS of the vehicle and the ADAS may operate the vehicle in an autonomous or semi-autonomous mode based on the data from the controller 24. For purposes of this disclosure, an autonomous mode is defined as one in which each of vehicle propulsion, braking, and steering are controlled by the controller 24 and in a semi-autonomous mode the controller 24 controls one or two of vehicle propulsion, braking, and steering. In a non-autonomous mode a human operator controls each of vehicle propulsion, braking, and steering.

The controller 24 may include or be communicatively coupled to (e.g., through the communication network) more than one processor, e.g., controllers or the like included in the vehicle for monitoring and/or controlling various vehicle controllers. Examples of these type of dedicated controllers include a powertrain controller, a brake controller, a steering controller, etc. The controller 24 is generally arranged for communications on a vehicle communication network that can include a bus in the vehicle such as a controller area network (CAN) or the like, and/or other wired and/or wireless mechanisms.

The controller 24 is programmed to move the beam-steering device 18 to be aimed at a desired area of the lens 16 (e.g. following the scan tracks shown in FIG. 7), to instruct the light emitter 14 to emit light, and to selectively power at least some of the photodetectors 22. The selection of which photodetectors 22 are powered and which photodetectors 22 are not powered is based on the aim of the beam-steering device 18. Specifically, the controller 24 selectively powers different combinations of the photodetectors 22 based on the aim of the beam-steering device 18 at the areas of different refraction to correct for varying density of the uncorrected scan tracks, e.g., more dense scan tracks at the right and left ends in comparison to the middle in FIG. 9B.

The controller 24 is programmed to selectively power different combinations of the photodetectors 22 based on the aim of the beam-steering device 18 at the areas of different refraction of the lens 16. Specifically, as set forth above, the lens 16 increases in refraction in a direction away from the lateral axis Y and/or away from the longitudinal axis X. The controller 24 selectively powers different combinations of the photodetectors 22 based on the aim of the beam-steering device 18 along the longitudinal axis X and/or the lateral axis Y of the lens 16. The photodetectors 22 selectively powered are typically adjacent each other.

As set forth above, the photodetectors 22 may be grouped into groups 48. In the example shown in FIG. 16, the photodetectors 22 are grouped into groups 48 of twelve photodetectors 22, specifically three columns and four rows. It should be appreciated that this grouping is an example and the groups 48 may be of any suitable size without departing from the nature of the present disclosure.

Various combinations of photodetectors 22 of each group 48 may be powered based on the position of the beam-steering device 18, i.e., the aim of light from the light emitter 14 at different areas of refraction of the lens 16. As an example, in the example shown schematically in FIG. 16, the controller 24 may selectively power each row or column independent of other rows and columns, as shown in FIG. 16.

More specifically, the controller 24 is programmed to selectively power combinations of photodetectors 22 in groups 48 of photodetectors 22 in response to aim of the beam-steering device 18. An example of this is shown in FIG. 16. When the beam-steering device 18 is aimed at a middle of the lens 16, all photodetectors 22 of the groups 48 of photodetectors 22 are powered (e.g., all twelve photodetectors 22 of each group 48 of twelve photodetectors 22). The controller 24 is programmed to selectively power a first subset 52 of the photodetectors 22 of the group 48 in response to aim of the beam-steering device 18 at a first position between the middle of the lens 16 and an edge of the lens 16 spaced from the middle along the longitudinal axis X. The first subset 52 of photodetectors 22 is smaller than the group 48 of photodetectors 22 (e.g., nine photodetectors 22 of each group 48 of twelve photodetectors). The controller 24 is programmed to selectively power a second subset 54 of the photodetectors 22 of the group 48 in response to aim of the beam-steering device 18 at a second position between the first position and the edge of the lens 16. The second subset 54 of photodetectors 22 is smaller than the first subset 52 of photodetectors 22 (e.g., six photodetectors 22 of each group 48 of 12). Finally, in the example in FIG. 16, the controller 24 is programmed to selectively power a third subset 56 of the photodetectors 22 of the group 48 in response to aim of the beam-steering device 18 at a third position between the second position and the edge of the lens 16. The third subset 56 of photodetectors 22 is smaller than the second subset 54 of photodetectors 22 (e.g., three photodetectors 22 of each group 48 of twelve photodetectors 22).

Figure 15:
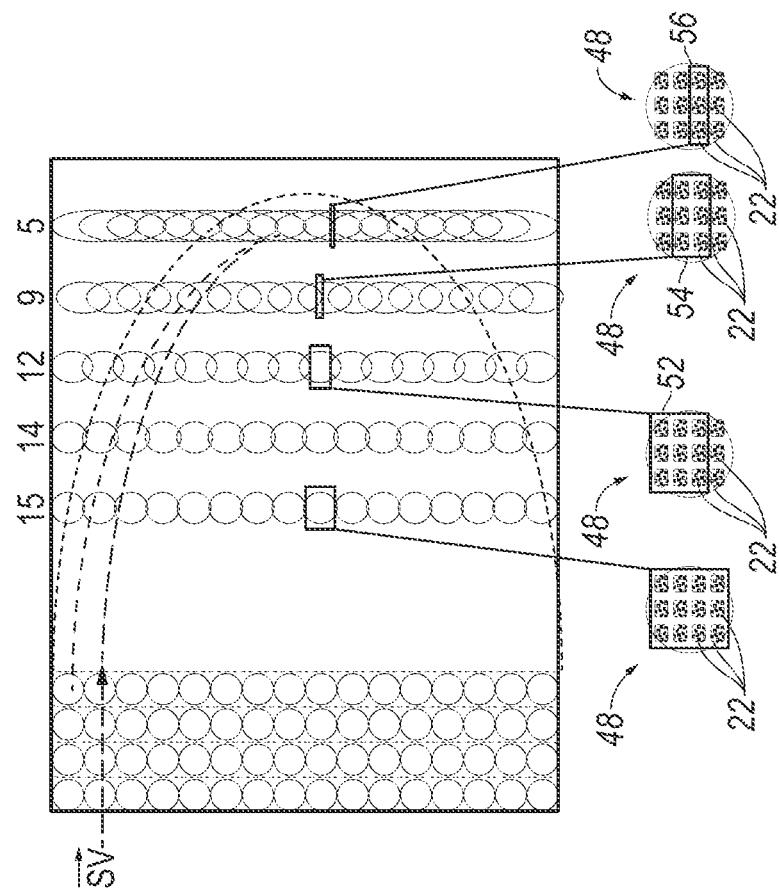
FIG. 15 schematically shows the effective stretching of the viewing areas of groups of photodetectors with the corrective refraction of the lens of some of the examples.
Figure 14:
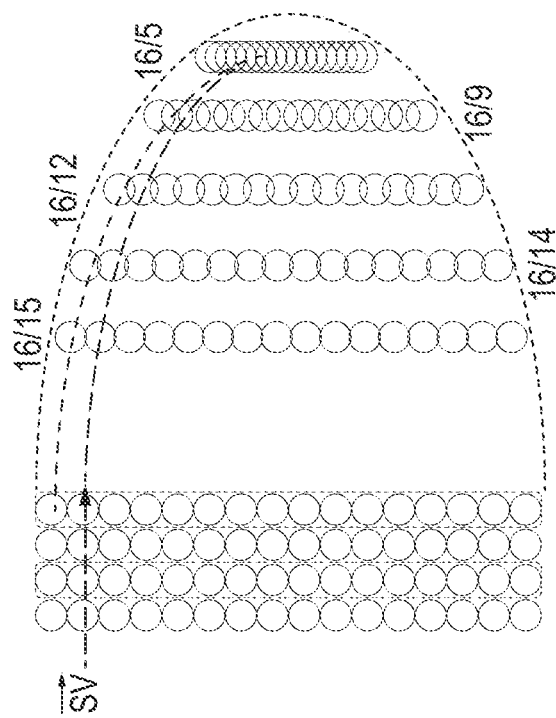
FIG. 14 schematically shows the effective viewing area of groups of photodetectors along scan tracks of FIG. 7 without correction by one of the example lenses.

As an example, the dots in FIGS. 14 and 15 schematically indicate the effective viewing area of groups 48 of photodetectors 22. FIG. 14 shows that these viewing areas overlap toward ends of the lens 16 due to the curving scan track of the beam-steering device 18 (see FIG. 7). The increased density of the scan tracks in FIG. 14 results in overlapping scans. Since the scan tracks overlap, the total number of scan tracks reduces (e.g., reducing from 16, to 15, to 14, to 12, to 9 and ultimately to 5). FIG. 15 shows the effective stretching of the viewing areas with the corrective refraction of the lens 16. As shown in FIG. 15, this stretching generates an increased field of illumination FOI and the viewing areas overlap. This stretching increases toward the end of the lens 16 and portions of the viewing area overlap. To effectively eliminate this overlap in the stretched viewing area, the controller 24, for each group 48, powers less than all of the photodetectors 22. For example, in the middle of the lens 16 where there is no overlap of scan tracks, all 12 photodetectors 22 are powered. Where the overlap of the scan tracks reduces the total effective number of scan tracks from 16 to 12, three rows of the photodetectors 22 are powered and one row is not powered. Where the overlap of the scan tracks reduces the total effective number scan tracks to 9, two rows of photodetectors 22 are powered and two rows are not powered. Where the overlap of the scan tracks reduces the total effective number of scan tracks to 5, one row of photodetectors 22 is powered and three rows are not powered.

An example method 1600 is shown in FIG. 16. As set forth above, the controller 24 is programmed to perform the method 1600. With reference to block 1605, the method includes positioning the beam-steering device 18 to direct light from the light emitter 14 through a lens 16 having areas of different refraction. Specifically, the method includes moving the beam-steering device 18 to aim the light at a selected area of the lens 16. For example, in an example in which the beam-steering device 18 includes MEMS mirrors, the MEMS mirrors are moved, as described above, to aim the light at the selected area of the lens 16.

As shown FIG. 16, the method 1600 repeats. Through this repetition, the movement of the beam-steering device 18 in block 1605 follows scan tracks, e.g., the scan tracks shown in FIG. 7.

The method includes recognizing the position of the beam-steering device 18. As set forth below, the position of the beam-steering device 18 relative to the lens 16 is used to control the selective powering of the different combinations of photodetectors 22. As an example, the controller 24 may instruct the beam-steering device 18 to assume a position and may then use that position in the selective powering of different combinations of photodetectors 22. As another example, the beam-steering device 18 may provide feedback to the controller 24 identifying the position of the beam-steering device 18 for use by the controller 24 in selectively powering different combinations of photodetectors 22.

With reference to block 1610, the method 1600 includes selectively powering different combinations of photodetectors 22 based on the aim of the beam-steering device 18 at the areas of different refraction. Specifically, the light emitter 14 is then powered, as described above, to emit light to the beam-steering device 18, which aims the light to a selected area of the lens 16. The light travels through the lens 16 and into the field of illumination FOI.

With reference to block 1615, the method 1600 includes emitting light from the light emitter 14 to illuminate the field of illumination FOI. For example, the method 1600 includes selectively powering different combinations of the photodetectors 22 based on the aim of the MEMS mirror along the longitudinal axis X and/or the lateral axis Y of the lens 16. As set forth above, the photodetectors 22 that are powered in a combination of photodetectors 22 are adjacent each other. Specifically, as set forth above, the photodetectors 22 may be grouped into groups 48 (e.g., groups 48 of 12 photodetectors 22 in the example in FIG. 16). For each group 48, various combinations of adjacent photodetectors 22 may be powered based on the position of the beam-steering device 18, i.e., the aim of light from the light emitter 14 at different areas of refraction of the lens 16. In the example shown schematically in FIG. 16, the controller 24 may selectively power each row or column independent of other rows and columns, as shown in FIG. 16.

More specifically, the controller 24 is programmed to selectively power combinations of photodetectors 22 in groups 48 of photodetectors 22 in response to the aim of the beam-steering device 18. For example, as shown schematically in FIG. 16, block 1610 includes selectively powering a group 48 of the photodetectors 22 in response to aim of the MEMS mirror at a middle of the lens 16. Block 1610 includes selectively powering a first subset 52 of the photodetectors 22 of the group 48 in response to aim of the MEMS mirror at a first position between the middle of the lens 16 and an edge of the lens 16 spaced from the middle along the longitudinal axis X. The first subset 52 of photodetectors 22 is smaller than the group 48 of photodetectors 22, as shown in FIG. 16. Block 1610 includes selectively powering a second subset 54 of the photodetectors 22 of the group 48 in response to aim of the MEMS mirror at a second position between the first position and the edge of the lens 16. The second subset 54 of photodetectors 22 is smaller than the first subset 52 of photodetectors 22, as shown in FIG. 16. Block 1610 may include selectively powering any suitable number of subsets (e.g., the example in FIG. 16 further includes the third subset 56 that is smaller than the second subset 54).

With reference to block 1620, the method includes reading out data from the photodetectors 22. For example, the ROIC 46 may read out data from the photodetectors 22, as described above. Block 1620 is shown after block 1615 and FIG. 16 shows the method 1600 returning from block 1620 to block 1605 to repeat the method 1600. It should be appreciated that blocks 1605-1615 may be repeated multiple times before block 1620 is performed, i.e., in some examples, the feedback loop may extend from block 1615 to block 1605.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a light emitter;
a lens having areas of different refraction;
a beam-steering device between the light emitter and the lens to direct light from the light emitter through the lens, the beam-steering device designed to scan the aim of light from the light emitter to different ones of the areas of different refraction;
a light sensor having a plurality of photodetectors; and
a controller programmed to selectively power different combinations of the photodetectors based on the aim of the beam-steering device at the areas of different refraction.

2. The system as set forth in claim 1, wherein the lens is elongated along a longitudinal axis and the refraction of the lens varies along the longitudinal axis, the controller programmed to selectively power different combinations of the photodetectors based on the aim of the beam-steering device along the longitudinal axis.

3. The system as set forth in claim 2, wherein the lens includes a lateral axis perpendicular to the longitudinal axis and the refraction of the lens varies along the lateral axis, the controller programmed to selectively power different combinations of the photodetectors based on the aim of the beam-steering device along the lateral axis.

4. The system as set forth in claim 1, wherein the controller is programmed to:
selectively power a group of the photodetectors in response to aim of the beam-steering device at a middle of the lens; and
selectively power a first subset of the photodetectors of the group in response to aim of the beam-steering device at a first position between the middle of the lens and an edge of the lens spaced from the middle along the longitudinal axis, the first subset of photodetectors being smaller than the group of photodetectors.

5. The system as set forth in claim 4, wherein the controller is programmed to:
selectively power a second subset of the photodetectors of the group in response to aim of the beam-steering device at a second position between the first position and the edge of the lens, the second subset of photodetectors being smaller than the first subset of photodetectors.

6. A method comprising:
emitting light from a light emitter of a LADAR sensor to illuminate a field of illumination;
aiming a beam-steering device to direct light from the light emitter through a lens having areas of different refraction; and
selectively powering different combinations of photodetectors of the LADAR sensor based on the aim of the beam-steering device at the areas of different refraction.

7. The method as set forth in claim 6, wherein the lens is elongated along a longitudinal axis and the refraction of the lens varies along the longitudinal axis, and further comprising selectively powering different combinations of the photodetectors based on the aim of the beam-steering device along the longitudinal axis.

8. The method as set forth in claim 7, wherein the lens includes a lateral axis perpendicular to the longitudinal axis and the refraction of the lens varies along the lateral axis, and further comprising selectively powering different combinations of the photodetectors based on the aim of the beam-steering device along the lateral axis.

9. The method as set forth in claim 1, further comprising:
selectively powering a group of the photodetectors in response to aim of the beam-steering device at a middle of the lens; and
selectively powering a first subset of the photodetectors of the group in response to aim of the beam-steering device at a first position between the middle of the lens and an edge of the lens spaced from the middle along the longitudinal axis, the first subset of photodetectors being smaller than the group of photodetectors.

10. The method as set forth in claim 9, further comprising:
selectively powering a second subset of the photodetectors of the group in response to aim of the beam-steering device at a second position between the first position and the edge of the lens, the second subset of photodetectors being smaller than the first subset of photodetectors.

11. A LADAR sensor comprising:
a light emitter;
a lens elongated along a longitudinal axis and having a lateral axis perpendicular to the longitudinal axis;
the lens including a first portion and a second portion, the lateral axis being between the first portion and the second portion;
a beam-steering device between the light emitter and the lens to direction light from the light emitter through the lens, the beam-steering device designed to scan the aim of light from the light emitter in a pattern elongated along the longitudinal axis;
the first portion and the second portion progressively increasing in refractive index in a direction away from the lateral axis to spread the light in ends of the field of view.

12. The LADAR sensor as set forth in claim 11, wherein the first portion and the second portion progressively increase in refractive index in a direction away from the longitudinal axis.

13. The LADAR sensor as set forth in claim 11, wherein:
the lens includes a third portion opposite the first portion relative to the longitudinal axis; and
the lens includes a fourth portion opposite the second portion relative to the longitudinal axis;
the lateral axis is between the third portion and the fourth portion;

the third portion and the fourth portion progressively increase in refractive index in a direction away from the lateral axis; and the first portion, the second portion, the third portion, and the fourth portion progressively increase in refractive index linearly in a direction away from the longitudinal axis.

14. The LADAR sensor as set forth in claim 13, wherein the first portion, the second portion, the third portion, and the fourth portion progressively increase linearly in refractive index in a direction away from the lateral axis.

15. The LADAR sensor as set forth in claim 13, wherein the first portion, the second portion, the third portion, and the fourth portion progressively increase nonlinearly in refractive index in a direction away from the lateral axis.

16. The LADAR sensor as set forth in claim 13, wherein the first portion, the second portion, the third portion, and the fourth portion each increase stepwise in refractive index in a direction away from the lateral axis.

17. The LADAR sensor as set forth in claim 11, wherein:
the lens includes a third portion opposite the first portion relative to the longitudinal axis; and
the lens includes a fourth portion opposite the second portion relative to the longitudinal axis;
the lateral axis is between the third portion and the fourth portion; and
the third portion and the fourth portion progressively increase in refractive index in a direction away from the lateral axis.

18. The LADAR sensor as set forth in claim 17, wherein the first portion, the second portion, the third portion, and the fourth portion each progressively increase in refractive index in a direction away from the longitudinal axis.

19. The LADAR sensor as set forth in claim 18, wherein the first portion, the second portion, the third portion, and the fourth portion each include a plurality of flat faces, each of the flat faces increasing in refractive index in a direction away from the longitudinal axis and in a direction away from the longitudinal axis.

20. The LADAR sensor as set forth in claim 18, wherein the lens includes a flat middle portion extending from the first portion and third portion to the second portion and fourth portion.

21. The LADAR sensor as set forth in claim 17, wherein:
the first portion abuts the third portion at the longitudinal axis and abuts the second portion at the lateral axis;
the fourth portion abuts the second portion at the longitudinal axis and abuts the third portion at the lateral axis.

22. The LADAR sensor as set forth in claim 11, further comprising a flat middle portion extending from the first portion to the second portion.

23. The LADAR sensor as set forth in claim 11, wherein the beam-steering device is a micro-electromechanical system (MEMS) mirror.

* * * * *